(12) United States Patent
Yoshida

(10) Patent No.: US 7,348,049 B2
(45) Date of Patent: *Mar. 25, 2008

(54) HONEYCOMB STRUCTURAL BODY, MANUFACTURING METHOD OF THE HONEYCOMB STRUCTURAL BODY, AND EXHAUST GAS PURIFYING DEVICE

(75) Inventor: Yutaka Yoshida, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 431 days.

This patent is subject to a terminal disclaimer.

(21) Appl. No.: 11/098,410

(22) Filed: Apr. 5, 2005

(65) Prior Publication Data

US 2005/0229565 A1    Oct. 20, 2005

(30) Foreign Application Priority Data

Apr. 5, 2004    (JP)    ............................. 2004-111430
Dec. 24, 2004    (JP)    ................. PCT/JP2004/019377

(51) Int. Cl.
*B32B 18/00*    (2006.01)
*B22F 3/105*    (2006.01)

(52) U.S. Cl. ............................. 428/116; 55/523; 419/41

(58) Field of Classification Search .................. 55/523; 428/116, 593; 422/179, 180, 177; 60/299
See application file for complete search history.

(56) References Cited

U.S. PATENT DOCUMENTS 5,914,187 A    6/1999    Naruse et al.
5,930,994 A    8/1999    Shimato et al.

(Continued)

FOREIGN PATENT DOCUMENTS

EP    0 449 556 A2    10/1991

(Continued)

OTHER PUBLICATIONS

U.S. Appl. No. 11/476,929.

(Continued)

*Primary Examiner*—D. Lawrence Tarazano
*Assistant Examiner*—Lauren E Robinson
(74) *Attorney, Agent, or Firm*—Oblon, Spivak, McClelland, Maier & Neustadt, P.C.

(57) ABSTRACT

A honeycomb structural body comprising: a pillar-shaped ceramic block and a sealing material provided on an outer peripheral portion of said ceramic block, each of them having irregularities formed on an outer peripheral face wherein: when a least square curve is determined by a least square method on the basis of points constituting the contour of a cross-section, a center-of-gravity is defined as c1, a distance between a minimum concentric circumscribed curve having c1 and the center-of-gravity c1 is defined as D1, a distance between a maximum concentric inscribed curve having c1 and the center-of-gravity c1 is defined as D2, and the following inequality is satisfied: about 0.3 mm$\leq$(D1-D2); same definition is applied to said ceramic block, a center-of-gravity thereof is defined as c2, a distance between a minimum concentric circumscribed curve having c2 and the center-of-gravity c2 is defined as D3, a distance between a maximum concentric inscribed curve having c2 and the center-of-gravity c2 is defined as D4, and the following inequality is satisfied: about 0.5 mm$\leq$(D3-D4) $\leq$about 7.0 mm.

53 Claims, 11 Drawing Sheets

U.S. PATENT DOCUMENTS

| | | |
|---|---|---|
| 6,447,564 B1 | 9/2002 | Ohno et al. |
| 6,565,630 B2 | 5/2003 | Ohno et al. |
| 6,669,751 B1 | 12/2003 | Ohno et al. |
| 6,770,116 B2 | 8/2004 | Kojima |
| 6,939,825 B1 | 9/2005 | Ohno et al. |
| 2004/0009106 A1 * | 1/2004 | Galligan et al. ............ 422/180 |
| 2004/0031264 A1 | 2/2004 | Kojima |
| 2004/0033175 A1 | 2/2004 | Ohno et al. |
| 2004/0055265 A1 | 3/2004 | Ohno et al. |
| 2004/0093858 A1 * | 5/2004 | Aoki ........................ 60/299 |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0025933 A1 | 2/2005 | Masukawa et al. |
| 2005/0076626 A1 | 4/2005 | Kudo et al. |
| 2005/0095179 A1 | 5/2005 | Kasai et al. |
| 2005/0095395 A1 | 5/2005 | Miwa |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0159310 A1 | 7/2005 | Ohno et al. |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0235621 A1 | 10/2005 | Kunieda et al. |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0029897 A1 | 2/2006 | Saijo et al. |
| 2006/0029898 A1 | 2/2006 | Saijo et al. |
| 2006/0032203 A1 | 2/2006 | Komori et al. |
| 2006/0043652 A1 | 3/2006 | Saijo et al. |
| 2006/0059877 A1 | 3/2006 | Yoshida |
| 2006/0172113 A1 | 8/2006 | Kunieda |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kuneida |

FOREIGN PATENT DOCUMENTS

| | | | |
|---|---|---|---|
| EP | 1 384 508 A1 | | 1/2004 |
| JP | 2-207846 | | 8/1990 |
| JP | 8-28246 | | 1/1996 |
| JP | 2001-170426 | | 6/2001 |
| JP | 2001-329836 | | 11/2001 |
| JP | 2002-273130 | | 9/2002 |
| JP | 2003-260322 | | 9/2003 |
| JP | 2003-262118 | | 9/2003 |
| WO | 2002076579 | * | 10/2002 |
| WO | 2004024293 | * | 3/2004 |
| WO | WO 2005/009614 A1 | | 2/2005 |

OTHER PUBLICATIONS

U.S. Appl. No. 11/496,431.
U.S. Appl. No. 11/513,149.
U.S. Appl. No. 11/518,998.
U.S. Appl. No. 11/600,775.
U.S. Appl. No. 11/600,784.
U.S. Appl. No. 10/129,126.
U.S. Appl. No. 11/225,197.
U.S. Appl. No. 10/502,044, filed Jan. 24, 2005, Taoka et al.
U.S. Appl. No. 10/515,179, filed Jul. 19, 2005, Yamada.
U.S. Appl. No. 10/516,328, Aug. 17, 2005, Komori et al.
U.S. Appl. No. 10/518,548, filed Jan. 3, 2005, Takahashi.
U.S. Appl. No. 10/521,592, filed Oct. 27, 2005, Ohno et al.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/174,726, filed Jul. 6, 2005, Ohno et al.
U.S. Appl. No. 11/174,483, filed Jul. 6, 2005, Saijo et al.
Patent Abstracts of Japan, JP 05-269388, Oct. 19, 1993.

* cited by examiner

A-A Line cross-sectional view

US 7,348,049 B2

HONEYCOMB STRUCTURAL BODY, MANUFACTURING METHOD OF THE HONEYCOMB STRUCTURAL BODY, AND EXHAUST GAS PURIFYING DEVICE

CROSS-REFERENCE TO RELATED APPLICATIONS

This application claims benefit of priority to Japanese Patent Application No. 2004-111430, filed on Apr. 5, 2004, and PCT Application No. PCT/JP2004/019377 filed on Dec. 24, 2004. The contents of those Applications are incorporated herein by reference in their entirety.

FIELD OF THE INVENTION

The present invention relates to a honeycomb structural body, a manufacturing method of the honeycomb structural body, and an exhaust gas purifying device.

DISCUSSION OF THE BACKGROUND

In recent years, a problem has been raised about harm to the environment and the human body caused by particulates contained in exhaust gas discharged from internal combustion engines of vehicles such as automobiles, buses, and trucks, and constitution machines and the like. A variety of honeycomb filters have been proposed, in which exhaust gas is allowed to pass through porous ceramic, and particulates therein is then collected so that the exhaust gas is purified.

FIG. 1A is a perspective view that schematically shows one example of such a honeycomb filter, and FIG. 1B is a cross-sectional view of the honeycomb filter shown in FIG. 1A. Further, FIG. 2A is a perspective view that schematically shows one example of a porous ceramic member constituting the honeycomb filter shown in FIG. 1A, and FIG. 2B is a cross-sectional view taken along line A-A of FIG. 2A.

As shown in FIG. 1A, in a conventional honeycomb filter 90, a plurality of porous ceramic members 95 made of silicon carbide or the like are bound to one another through a sealing material layer 91 to constitute a ceramic block 93, and a sealing material layer 92 is formed on the outer periphery of the ceramic block 93.

Further, as shown in FIGS. 2A and 2B, in each of the porous ceramic members 95, a number of through holes 96 are placed in parallel with one another in the length direction so that the partition wall 98 that separates through holes 96 functions as a filter. Namely, as shown in FIG. 2B, each of the through holes 96 that are formed in the porous ceramic member 95 has one end thereof, on either an exhaust gas inlet side or outlet side, sealed with a plug 97, so that exhaust gas having flown into one through hole 96 necessarily passes through the partition wall 98 separating the through holes 96, and then flows out of another through hole 96.

In an exhaust gas purifying device, the honeycomb filter 90 with such a structure is installed in a casing connected to an exhaust passage in an internal combustion engine through a mat-like holding sealing material, and particulates in the exhaust gas discharged from the internal combustion engine are collected by the partition wall 98 as passing through this honeycomb filter 90, leading to purification of the exhaust gas.

However, in the exhaust gas purifying device with the above-mentioned structure, as shown in FIG. 1B, the honeycomb filter, installed in the casing through the mat-like holding sealing material, is constituted by forming the sealing material layer 92 on the outer peripheral face of the ceramic block 93. This structure might cause displacement of the honeycomb filter in the casing when pressure that is applied on the end face of the exhaust gas inlet side of the honeycomb filter is raised with an increase in collected amount of the particulates contained in the exhaust gas, or when the holding power of the honeycomb filter, generated by the mat-like holding sealing material, inside the casing is reduced due to expansion of the casing to a size larger than that of the honeycomb filter through heating to a high temperature.

Upon occurrence of displacement of the honeycomb filter inside the casing as described above, the length direction of the honeycomb filter might become non-parallel with the flowing direction of the exhaust gas to cause reduction in particulate collecting efficiency, or the honeycomb filter might be brought into contact with the casing to generate cracks in the honeycomb filter. Further, the mat-like holding sealing material might droop onto the end face of the exhaust gas inlet side of the honeycomb filter, closing the through holes exposed at this side to cause reduction in exhaust gas purifying efficiency.

To deal with this, JP-A 2003-262118 discloses a honeycomb structural body with the cross-sectional shape thereof changed from an exactly circular shape to a flat shape to adjust the circularity for improving the holding power of the honeycomb structural body. Further, JP-A 2001-329836 discloses a honeycomb structural body having irregularities formed on the outer periphery thereof to adjust the circularity. When each of these honeycomb structural bodies is installed in a casing through a mat-like holding sealing material as an exhaust gas purifying device, the mat-like holding sealing material fits into the recesses on the outer periphery of the honeycomb structural body so as to fill the recesses, thereby to improve the holding power of the honeycomb structural body inside the casing.

JP-A 2003-260322 discloses a honeycomb structural body, in which a bonding layer provided in the slanting direction of through holes is set thick so as to increase the isostatic strength.

The contents of JP-A 2003-262118, JP-A 2001-329836 and JP-A 2003-260322 are incorporated herein by reference in their entirety.

SUMMARY OF THE INVENTION

The honeycomb structural body of the present invention is porous ceramic which includes a number of through holes that are placed in parallel with one another in the length direction with a wall portion interposed therebetween; and a sealing material provided on an outer peripheral portion of said pillar-shaped ceramic block, each of said honeycomb structural body and said pillar-shaped ceramic block having irregularities formed on an outer peripheral face thereof wherein when a least square curve is determined by a least square method on the basis of points constituting the contour of a cross-section perpendicular to the length direction of said honeycomb structural body, a center-of-gravity thereof is defined as c1, a distance between a minimum concentric circumscribed curve, having c1 as the center-of-gravity, of said least square curve and the center-of-gravity c1 is defined as D1, a distance between a maximum concentric inscribed curve, having c1 as the center-of-gravity, of said least square curve and the center-of-gravity c1 is defined as D2, and (D1−D2) is defined as M1, the following inequality is satisfied: about 0.3 mm≦M1, and when a least square curve is determined by a least square method on the basis of points constituting the contour of a cross-section perpendicular to the length direction of said ceramic block, a center-of-gravity thereof is defined as c2, a distance between a minimum concentric circumscribed curve, having c2 as the center-of-gravity, of said least square curve and the center-of-gravity c2 is defined as D3, a distance between a maximum concentric inscribed curve, having c2 as the center-of-gravity, of said least square curve and the center-of-gravity c2 is defined as D4, and (D3−D4) is defined as M2, the following inequality is satisfied: about 0.5 mm≦M2≦ about 7.0 mm.

In the honeycomb structural body, desirably, the center-of-gravity c1 does not correspond with the center-of-gravity c2. In this case, desirably, a distance between the center-of-gravity c1 and the center-of-gravity c2 is at least about 0.1 mm and at most about 10.0 mm.

In the honeycomb structural body, desirably, when at least three points are determined as the centers-of-gravities c2 of the least square curves in the length direction of the ceramic block, these centers-of-gravities c2 are not present on a straight line in parallel with the length direction of the ceramic block. Also desirably, when at least three points are determined as the centers-of-gravities c1 of the least square curves in the length direction of the honeycomb structural body, these centers-of-gravities c1 are not present on a straight line in parallel with the length direction of the honeycomb structural body.

In the honeycomb structural body, desirably, M1 is about 3.0 mm or less. Also desirably, said ceramic block has a porosity of at least about 20% and at most about 80%, more desirably, in a range of about 50% to 80%.

In the honeycomb structural body, desirably, said ceramic block is configured by combining a plurality of porous ceramic members to one another, more desirably, through a sealing material layer. In this case, desirably, the plurality of porous ceramic members include porous ceramic members having different shapes in end face, and each of said porous ceramic members is made of silicon carbide-natured ceramic.

In the honeycomb structural body, desirably, a catalyst is supported and each of said through holes is sealed at one of ends thereof.

A first aspect of manufacturing method of a honeycomb structural body according to a the present invention is a manufacturing method of a honeycomb structural body comprising a pillar-shaped ceramic block in which a plurality of porous ceramic members are combined with each other through a sealing material layer, said porous ceramic member including a large number of through holes placed in parallel with one another in a length direction with a partition wall interposed therebetween, wherein the method comprises a step of: processing an outer peripheral face of a ceramic dried body obtained by drying a ceramic molded body that contains a ceramic material constituting each of said porous ceramic members so as to form a plurality of kinds of ceramic dried bodies having different shapes.

A second aspect of manufacturing method of a honeycomb structural body according to the present invention is a manufacturing method of a honeycomb structural body comprising a pillar-shaped ceramic block in which a plurality of porous ceramic members are combined with each other through a sealing material layer, said porous ceramic member including a large number of through holes placed in parallel with one another in a length direction with a partition wall interposed therebetween, wherein the method comprises a step of: performing extrusion molding to form a plurality of kinds of ceramic molded bodies having different cross-sectional shapes.

An exhaust gas purifying device according to the present invention comprises the above-mentioned honeycomb structural body that is installed in a casing connected to an exhaust passage in an internal combustion engine through a mat-like holding sealing material. In the exhaust gas purifying device, desirably, the mat-like holding sealing material is a non-expansive ceramic fiber mat.

DESCRIPTION OF THE EMBODIMENTS

Figure 1A:
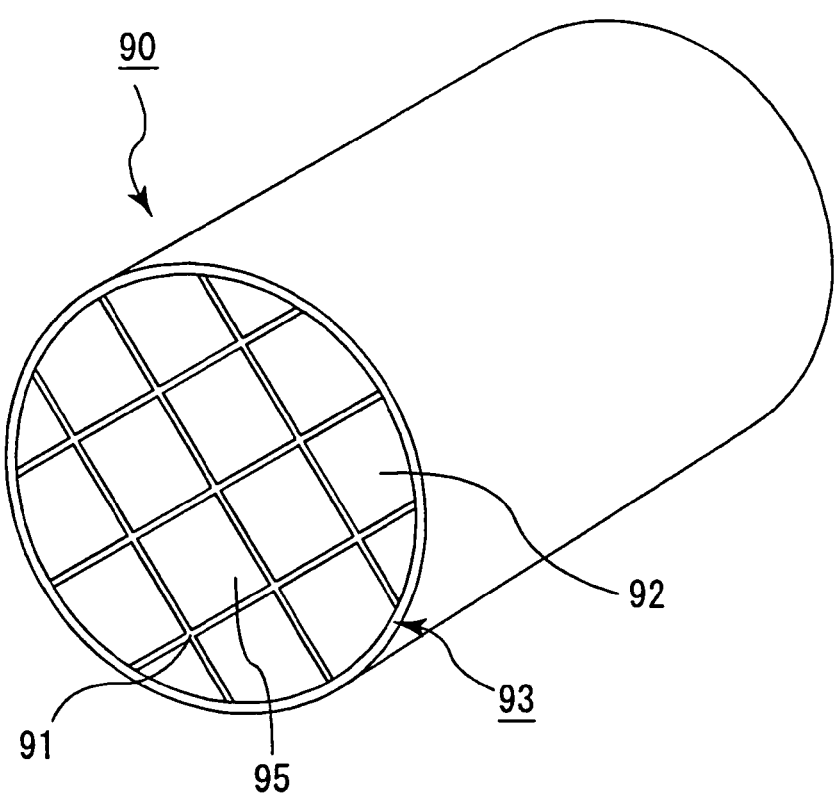
FIG. 1A is a perspective view that schematically shows one example of a conventional honeycomb filter and FIG. 1B is a cross-sectional view of the honeycomb filter shown in FIG. 1A.
Figure 1B:
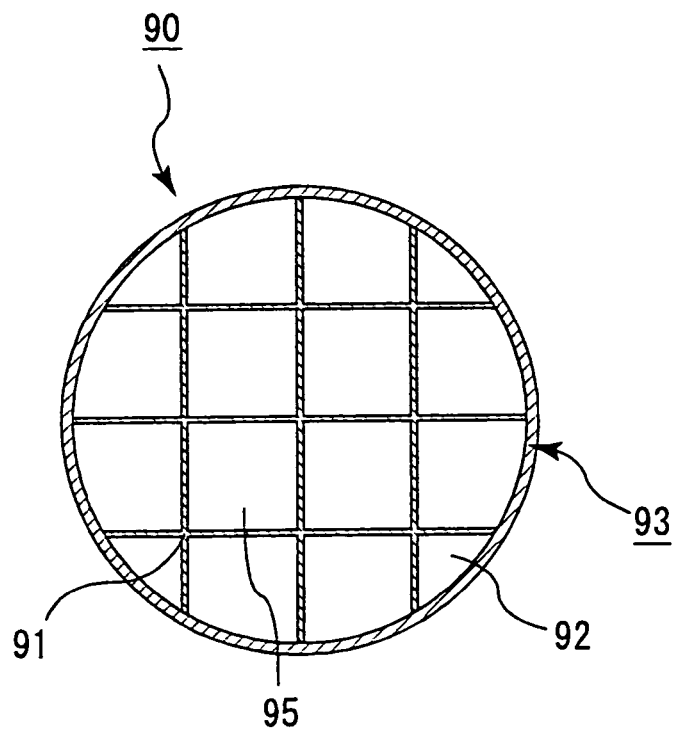
Figure 2A:
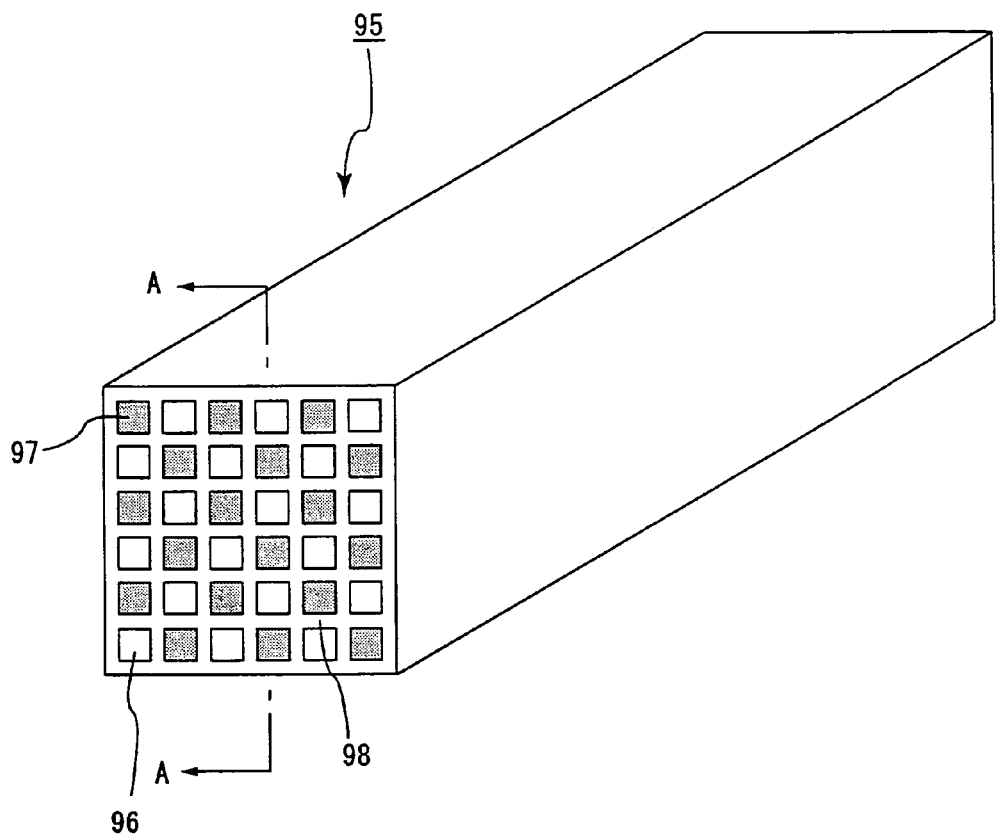
FIG. 2A is a perspective view that schematically shows one example of a porous ceramic member constituting the conventional honeycomb filter.
Figure 2B:
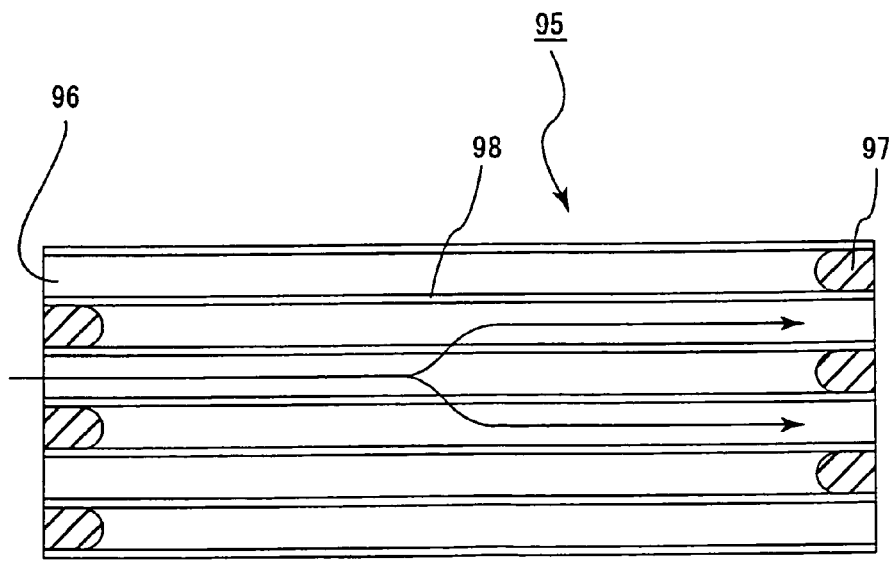
FIG. 2B is a cross-sectional view taken along line A-A of FIG. 2A.

In the following, a honeycomb structural body, a manufacturing method thereof and an exhaust gas purifying device of the present invention will be described with reference to the drawings.

First, the honeycomb structural body of the present invention will be described. The honeycomb structural body of the present invention is a honeycomb structural body comprising: a pillar-shaped ceramic block made of porous ceramic which includes a number of through holes that are placed in parallel with one another in the length direction with a wall portion interposed therebetween; and a sealing material provided on an outer peripheral portion of said pillar-shaped ceramic block, each of said honeycomb structural body and said pillar-shaped ceramic block having irregularities formed on an outer peripheral face thereof wherein when a least square curve is determined by a least square method on the basis of points constituting the contour of a cross-section perpendicular to the length direction of said honeycomb structural body, a center-of-gravity thereof is defined as c1, a distance between a minimum concentric circumscribed curve, having c1 as the center-of-gravity, of said least square curve and the center-of-gravity c1 is defined as D1, a distance between a maximum concentric inscribed curve, having c1 as the center-of-gravity, of said least square curve and the center-of-gravity c1 is defined as D2, and (D1−D2) is defined as M1, the following inequality is satisfied: about 0.3 mm≦M1, and when a least square curve is determined by a least square method on the basis of points constituting the contour of a cross-section perpendicular to the length direction of said ceramic block, a center-of-gravity thereof is defined as c2, a distance between a minimum concentric circumscribed curve, having c2 as the center-of-gravity, of said least square curve and the center-of-gravity c2 is defined as D3, a distance between a maximum concentric inscribed curve, having c2 as the center-of-gravity, of said least square curve and the center-of-gravity c2 is defined as D4, and (D3−D4) is defined as M2, the following inequality is satisfied: about 0.5 mm≦M2≦ about 7.0 mm.

The honeycomb structural body of the present invention has high strength (large durability) against thermal shock, and is less likely to generate cracks and damage and has excellent durability even in the case where a high pressure is applied to an outer peripheral face thereof.

Although the honeycomb structural body of the present invention is constituted by including a pillar-shaped ceramic block made of porous ceramic comprising a number of through holes that are placed in parallel with one another in the length direction with a wall portion interposed therebetween, the ceramic block may be constituted by combining pillar-shaped porous ceramic members, each comprising a plurality of through holes that are placed in parallel with one another in the length direction with a partition wall interposed therebetween, to one another through a sealing material layer (hereinafter, the honeycomb structural body (block) including the ceramic block with the above-mentioned structure is also referred to as an aggregate-type honeycomb structural body (block)), or the ceramic block may be constituted of a ceramic member integrally formed by sintering (hereinafter, a honeycomb structural body (block) including a ceramic block with the above-mentioned structure is also referred to as an integral-type honeycomb structural body (block))

In the honeycomb structural body of the present invention, when the ceramic block is the above-mentioned aggregate-type ceramic block, the wall portion is constituted of the partition wall that separate through holes in the porous ceramic members, the outer walls of the porous ceramic members, and the sealing material layer (which preferably function also as an adhesive) interposed between the porous ceramic members, whereas when the ceramic block is the above-mentioned integral-type ceramic block, the wall portion is constituted only of one kind of partition wall.

Figure 3:
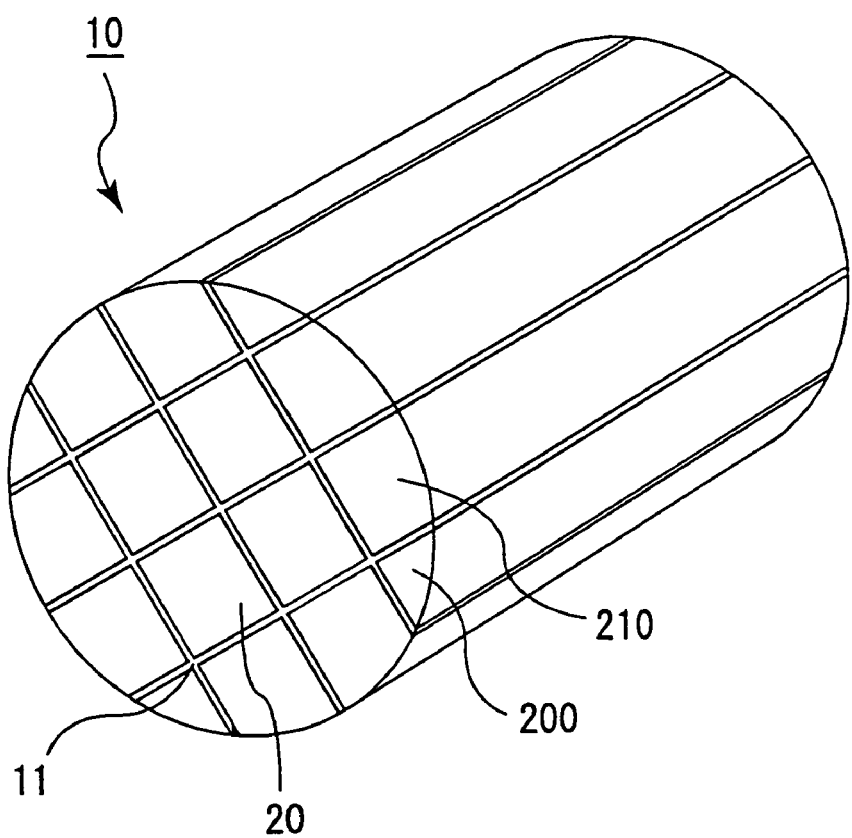
FIG. 3 is a perspective view that schematically shows one example of a honeycomb structural body of the present invention.
Figure 4A:
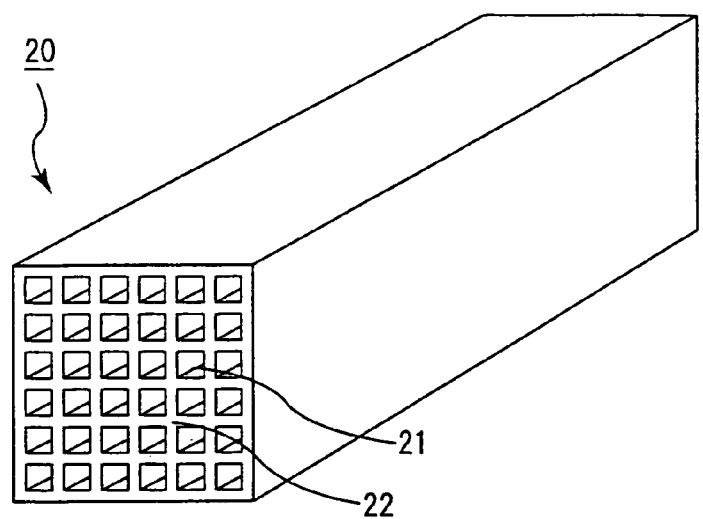
FIGS. 4A to 4C are perspective views that schematically show one example of porous ceramic members constituting the honeycomb structural body of the present invention.
Figure 4B:
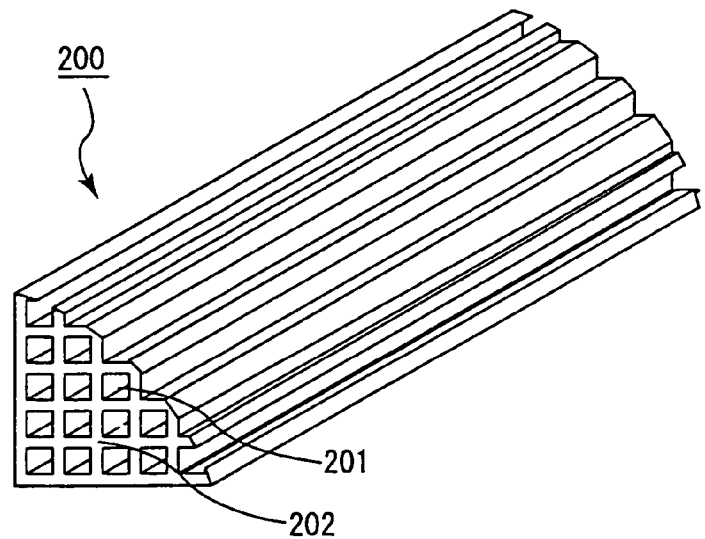
Figure 4C:
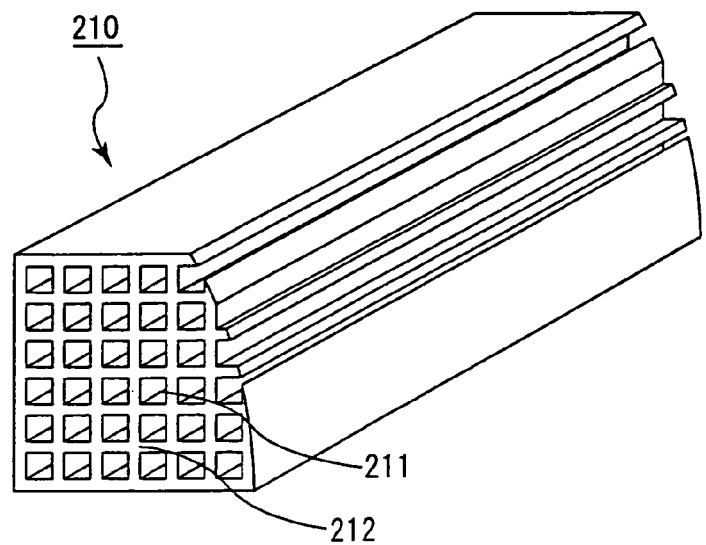

FIG. 3 is a perspective view that schematically shows one example of an aggregate-type ceramic block to be used in the honeycomb structural body of the present invention. FIGS. 4A to 4C are perspective views that schematically show one example of porous ceramic members constituting the ceramic block shown in FIG. 3.

As shown in FIG. 3, in a honeycomb structural body 10 of the present invention, a plurality of porous ceramic members 20, 200 and 210, each having a different shape, are bound to one another through a sealing material layer 11 to constitute a substantially cylindrical ceramic block, and although not shown in FIG. 3, irregularities are formed on the outer peripheral face of the ceramic block.

As shown in FIG. 4A, the porous ceramic member 20 constituting the honeycomb structural body 10 is a rectangular columnar body having a substantially square cross-section and comprising a number of through holes 21 that are placed in parallel with one another in the length direction with a partition wall 22 interposed therebetween.

Further, as shown in FIG. 4B, the porous ceramic member 200 is a pillar-shaped body with the outer periphery thereof partially cut off, having a substantially sectorial cross-section and comprising a number of through holes 201 that are placed in parallel with one another in the length direction with a partition wall 202 interposed therebetween, and part of the through holes 201 is exposed at the cut-off portion of the outer periphery. Namely, groove-shaped irregularities are formed by the exposed through holes 201 on part of the outer peripheral face of the porous ceramic member 200.

Further, as shown in FIG. 4C, the porous ceramic member 210 is a pillar-shaped body with the vicinity of one corner of the outer periphery thereof cut off, comprising a number of through holes 211 that are placed in parallel with one another in the length direction with a partition wall 212 interposed therebetween, and part of the through holes 211 is exposed at the cut-off portion of the outer periphery. Namely, groove-shaped irregularities are formed by the exposed through holes 211 on part of the outer peripheral face of the porous ceramic member 210.

The ceramic block 10 in the honeycomb structural body is configured by combining, through the sealing material layer 11, the porous ceramic members 20, 200 and 210 having the above-mentioned structures, in such a manner that the rectangular pillar-shaped porous ceramic members 20 having no irregularities formed on the outer peripheral face thereof are positioned in the vicinity of the center of the ceramic block, and the porous ceramic members 200 and the porous ceramic members 210, both having irregularities formed on the outer peripheral faces thereof, are positioned in the vicinity of the outer periphery of the ceramic block.

That is to say, in the honeycomb structural body 10, the groove-shaped irregularities on the outer peripheral face of the ceramic block are formed by partially removing the through holes that constitute the porous ceramic members 200 and the porous ceramic members 210 to expose the remaining portion at the outer peripheral face.

Figure 5:
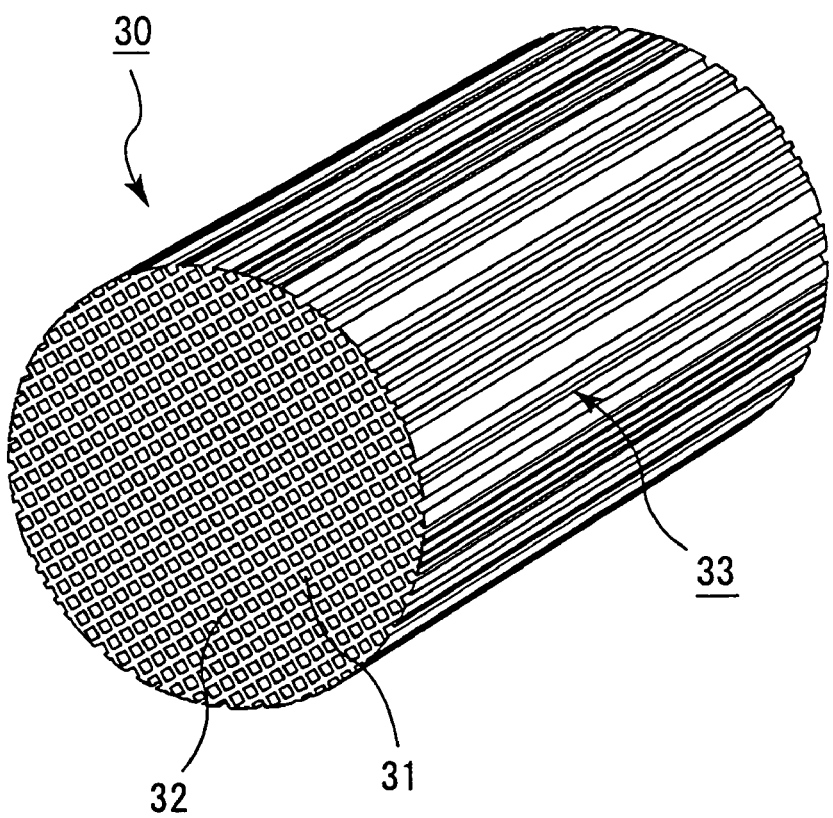
FIG. 5 is a perspective view that schematically shows another example of the honeycomb structural body of the present invention.

FIG. 5 is a perspective view that schematically shows one example of the integral-type ceramic block for use in the honeycomb structural body of the present invention.

This constitutes a substantially cylindrical ceramic block made of porous ceramic comprising a number of through holes 31 that are placed in parallel with one another in the length direction with a wall portion 32 interposed therebetween, and irregularities 33 are formed on the outer peripheral face of the ceramic block.

In a honeycomb structural body 30 having such a structure, as in the case of the honeycomb structural body 10 shown in FIGS. 3 and 4, the irregularities 33 on the outer peripheral face of the ceramic block are formed by partially removing the through holes 31 constituting the ceramic block to expose the remaining portion at the outer peripheral face.

As described above, in the honeycomb structural body of the present invention, irregularities are formed on the outer peripheral face of the ceramic block in the either case of the aggregate-type honeycomb structural body or the integral-type honeycomb structural body. Studies conducted by the present inventor have revealed the following: a conventional honeycomb structural body is provided with a sealing material layer to make the entire outer periphery thereof uniform and the side face of the cylinder flat by elimination of groove-shaped irregularities; however, in the case where a honeycomb structural body, with irregularities (desirably groove-shaped irregularities so as to exert an effect on all the cross-sections in the length direction) left on the outer peripheral face thereof is subjected to a thermal shock test and the like, resistance of the honeycomb structural body to thermal shock deteriorates when the state of the irregularities that are formed on the ceramic block becomes ill-balanced. The reason for this is not clear, but is presumably as follows.

In the honeycomb structural body, heat is released uniformly from the center toward the outer periphery, but with irregularities formed on the surface of the honeycomb structural body, the surface area increases to cause cooling effect, which is apt to induce rapid thermal shock. Further, in microscopic view, the top of the protrusion is considered as susceptible to thermal shock as compared with the bottom of the recess.

It is also considered that, at this time, the honeycomb member and the ceramic member do not exhibit exactly the same physical properties due to difference in material, density and the like between those two members, and hence thermal stress is also caused herein.

It is therefore thought that changing the states of the irregularities that are formed on the above two places may alleviate distortion of the insides thereof caused by thermal stress.

In the following, the irregularities that are formed on the outer peripheral faces of the honeycomb structural body of the present invention and the ceramic block will be described.

It is to be noted that, since measurement of the honeycomb structural body can be performed after formation of the sealing material (coating) layer on the ceramic block, in the same manner as measurement of the ceramic block, the following description is restricted to the measurement of the ceramic block. Although the ceramic block can naturally be measured during the process for manufacturing the honeycomb structural body, if it is to be measured after the manufacturing, the sealing material (coating) layer may be removed by processing, polishing and the like, and thereafter, the ceramic block portion may be measured in the same manner as done during the manufacturing process.

In the ceramic block for use in the honeycomb structural body of the present invention, the size of the irregularities that are formed on the outer peripheral face of the ceramic block can be determined first by plotting, on a two dimensional coordinate, positional data concerning points on the contour of a cross-section perpendicular to the length direction of the ceramic block (hereinafter, also simply referred to as a cross-section of the ceramic block), said positional data being obtained by measurement of not less than 10 points on the contour.

Figure 6A:
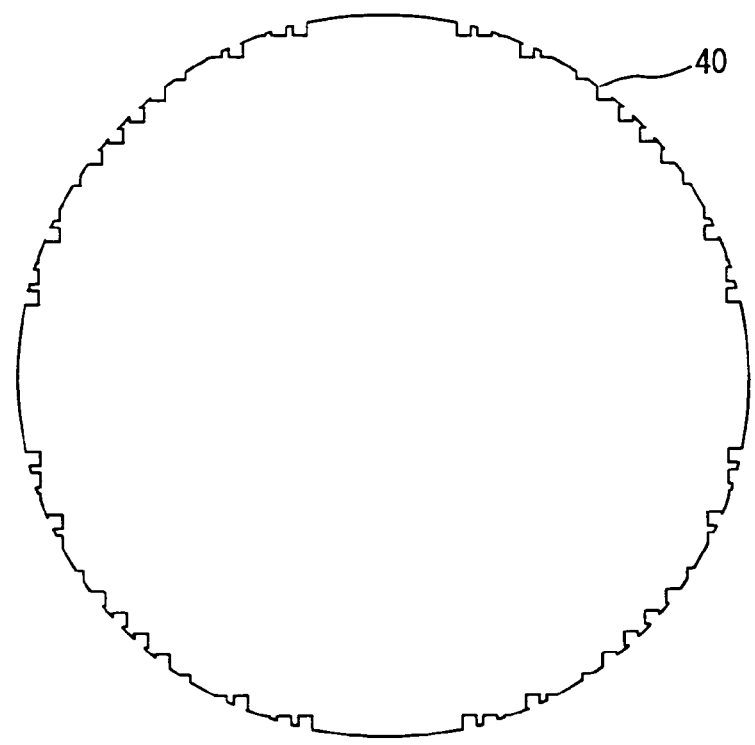
FIG. 6A is a view that shows one example of a curve drawn by plotting, on a two dimensional coordinate, positional data concerning points on the contour of a cross-section of a ceramic block.

FIG. 6A is a view that shows one example of a curve drawn by plotting, on a two dimensional coordinate, positional data concerning points on the contour of a cross-section of the above ceramic block.

As shown in FIG. 6A, when the positional data measured concerning points on the contour are plotted on the two dimensional coordinate, a curve 40 is drawn which has a bent portion in the substantially same shape as the above cross-section of the ceramic block.

It should be noted that the curve 40 shown in FIG. 6A is drawn by plotting, on the two dimensional coordinate, the positional data concerning points on the contour of the cross-section of the ceramic block in the honeycomb structural body 10 shown in FIG. 3, and in FIG. 6A, the two dimensional coordinate is omitted.

In the honeycomb structural body of the present invention, not less than 10 positional data concerning points on the contour are measured. If the number of the positional data to be measured is less than 10, the shape of the curve to be drawn on the two dimensional coordinate becomes considerably different from the cross-sectional shape of the ceramic block, making it impossible to accurately determine variations of the irregularities that are formed on the outer peripheral face of the ceramic block.

Although the number of the positional data to be measured is not particularly limited as long as the numbers are 10 or more, it is desirably 100 or more. This is because, with 100 or more positional data, the shape of the curve drawn on the two dimensional coordinate is approximate to the actual cross-sectional shape of the ceramic block.

Further, it is desirable that the points to be measured be equally spaced on the contour. This is because, with the points equally spaced, variations of the irregularities on the outer peripheral face of the ceramic block can be measured with higher accuracy.

When positional data concerning points on the contour are plotted on the two dimensional coordinate, a commercially available three dimensional measurement device can be employed.

The three dimensional measurement device is not particularly limited, and examples thereof may include "LEGEX Series", "FALCIO-APEX Series", "Bright-Apex Series", "MACH Series", "CHN Series, and "BH-V Series", which are manufactured by Mitsutoyo Corp.

Next, a least square curve is drawn on the two dimensional coordinate by the least square method using the positional data concerning points on the contour, to determine the center-of-gravity c2 of the least square curve.

Subsequently, the minimum concentric circumscribed curve of the least square curve, having c2 as the center-of-gravity, and the maximum concentric inscribed curve of the least square curve, having c2 as the center-of-gravity, are determined.

The minimum concentric circumscribed curve and the maximum concentric inscribed curve are not limited to circles, and may be ellipses or curves of other shapes. Further, the minimum concentric circumscribed curve and the maximum concentric inscribed curve are similar figures sharing the center-of-gravity c2.

If those curves are circles, it is advisable to conform to the method for obtaining circularity in JIS B 0621.

Figure 6B:
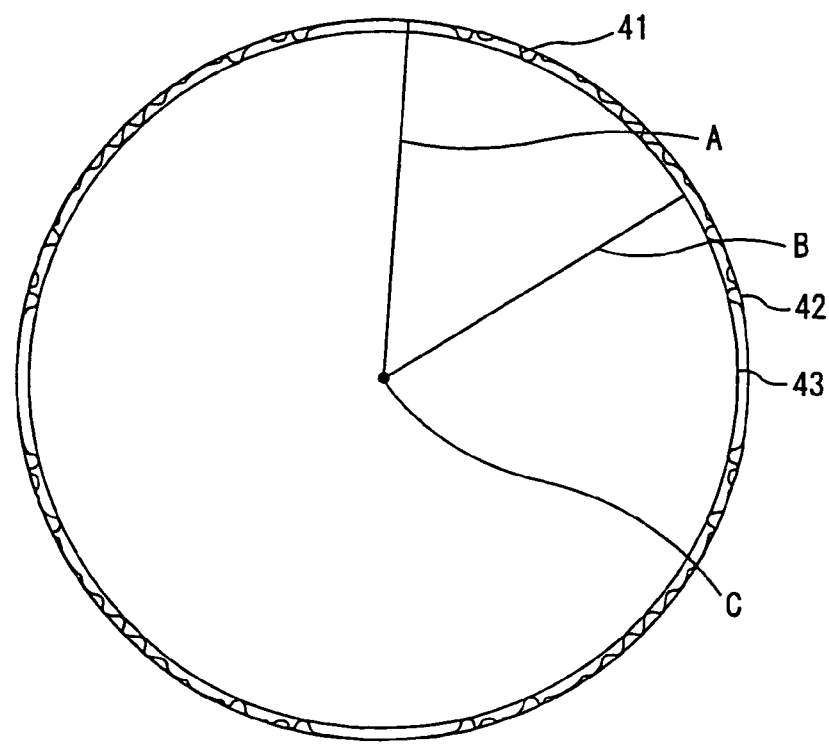
FIG. 6B is a view that shows one example of a least square curve, obtained by a least square method using the positional data shown in FIG. 6A, and two circles for creating a minimum region to be used when circularity of the least square curve is obtained based on JIS B 06210.

FIG. 6B is a view that shows one example of a least square curve, drawn by the least square method using the positional data shown in FIG. 6A, the minimum concentric circumscribed curve, the maximum concentric inscribed curve and the center-of-gravity c2, and in FIG. 6B, the two dimensional coordinate is omitted.

As shown in FIG. 6B, the least square curve 41 has less roughness than the curve 40 shown in FIG. 6A, and is constituted of the minimum concentric circumscribed curve 42 and the maximum concentric inscribed curve 43, the minimum concentric circumscribed curve 42 being a longer distance away from the center-of-gravity c2 than from the maximum concentric inscribed curve 43.

Herein, the minimum concentric circumscribed curve 42 and the maximum concentric inscribed curve 43 are concentric to one another, sharing the center-of-gravity c2, as described above; specifically, the minimum concentric circumscribed curve 42 is a curve the shortest distance away from the center-of-gravity c2 on which at least parts of the protrusions of the least square curve 41 are present and inside which the other portion of the least square curve 41 is present, while the maximum concentric inscribed curve 43 is a curve the longest distance away from the center-of-gravity c2 on which at least parts of the recesses of the least square curve 41 are present and outside which the other portion of the least square curve 41 is present.

In the present invention, the distance D3 between the center-of-gravity c2 and the minimum concentric circumscribed curve of the least square curve, and the distance D4 between the center-of-gravity c2 and the maximum concentric inscribed curve of the least square curve are measured, followed by calculation of: D3−D4=M2.

In the ceramic block in the honeycomb structural body of the present invention, M2 is allowed to represent the size of the irregularities that are formed on the outer face of the ceramic block.

Further, in the honeycomb structural body of the present invention, in exactly the same manner as in the case of the ceramic block, a least square curve is determined by the least square method based on points constituting the contour of a cross-section perpendicular to the length direction of the honeycomb structural body, and the center-of-gravity of the obtained least square curve is defined as c1. Subsequently, the minimum concentric circumscribed curve of the least square curve, having c1 as the center-of-gravity, is determined and a distance between the center-of-gravity c1 and the minimum concentric circumscribed curve is defined as a distance D1. Further, the maximum concentric inscribed curve of the least square curve, having c1 as the center-of-gravity, is determined and a distance between the center-of-gravity c1 and the maximum concentric inscribed curve is defined as a distance D2, followed by calculation of: D1−D2=M1.

In the honeycomb structural body of the present invention, M1 is about 0.3 mm or more.

When M1 is less than about 0.3 mm, almost no irregularities are formed on the outer peripheral face of the ceramic block, and thereby the problem of thermal stress, as described above, does not occur in the honeycomb structural body. M1 is desirably about 3.0 mm or less. When M1 exceeds about 3.0 mm, large irregularities are formed on the outer peripheral face of the honeycomb structural body, and in such a honeycomb structural body, as described above, thermal stress is apt to cause cracking or chipping in the protrusions of the outer peripheral face of the ceramic block.

Moreover, in the ceramic block for use in the honeycomb structural body of the present invention, the following inequality is satisfied: about 0.5 mm≦M2≦ about 7.0 mm.

It is considered that, when M2 is less than about 0.5 mm, almost no irregularities are formed on the outer peripheral face of the ceramic block and thermal stress is generated between the ceramic block and the sealing material (coating) layer, so that cracks are generated.

On the other hand, it is considered that, when M2 exceeds about 7.0 mm, large irregularities are formed on the outer peripheral face of the ceramic block, and in such a honeycomb structural body, thermal stress is generated between the ceramic block and the sealing material (coating) layer, so that cracks are generated.

As described above, irregularities having a predetermined size are formed on the outer peripheral face of the ceramic block in the honeycomb structural body of the present invention. While the irregularities on the outer peripheral face of the ceramic block may be formed by partially removing the through holes constituting the ceramic block to expose the remaining portion at the outer peripheral face as in the honeycomb structural bodies shown in FIGS. 3 to 5, step-shaped irregularities may for example be formed on the outer peripheral face of the ceramic block, as a honeycomb structural body 50 and a honeycomb structural body 500 shown in FIGS. 7A and 7B.

Figure 7A:
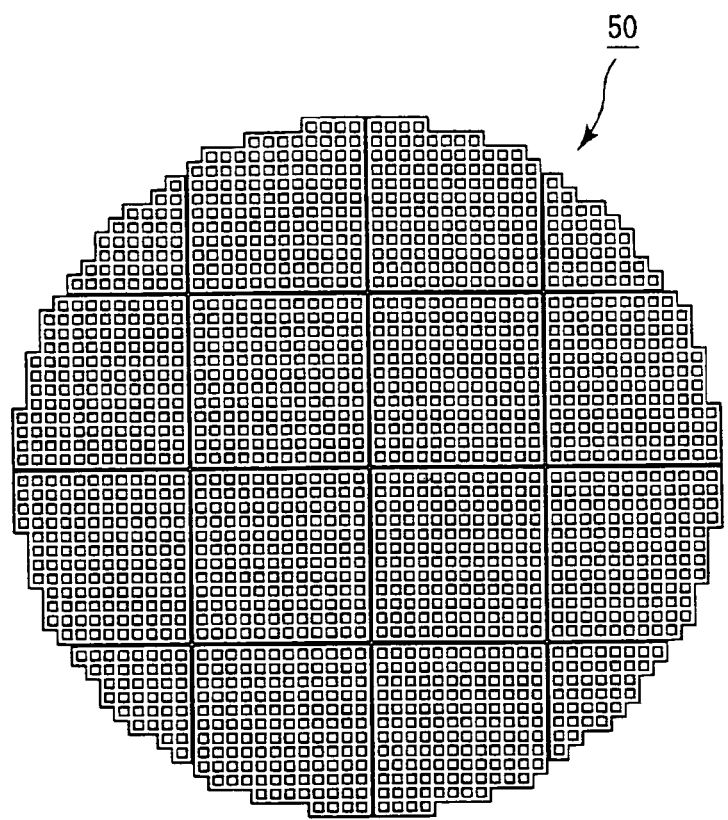
FIG. 7A is a front view that schematically shows another example of an aggregate-type honeycomb structural body as the honeycomb structural body of the present invention.
Figure 7B:
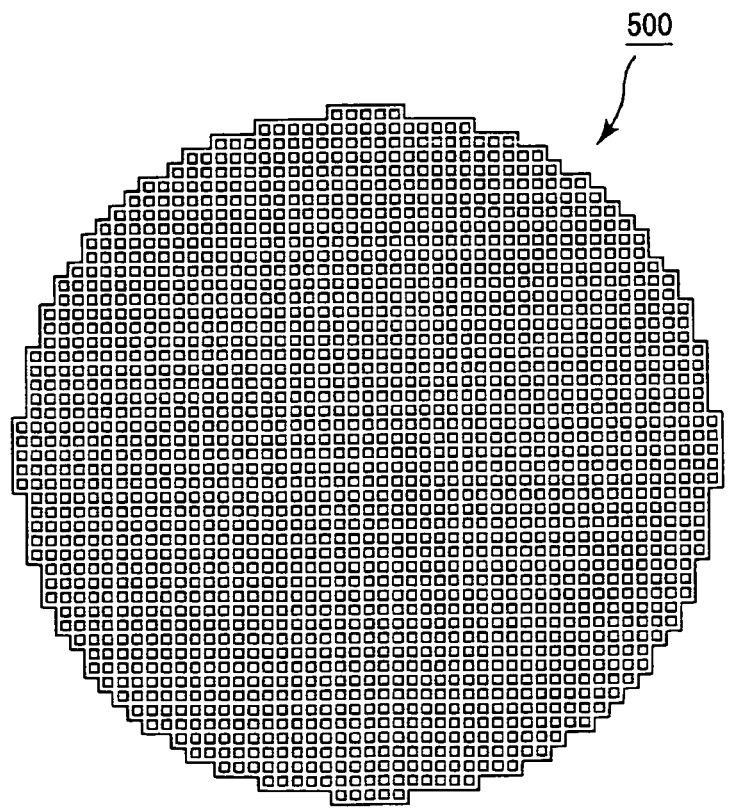
FIG. 7B is a front view that schematically shows another example of an integral-type honeycomb structural body as the honeycomb structural body of the present invention.

It is to be noted that FIG. 7A is a front view that schematically shows another example of the aggregate-type ceramic block 50, and FIG. 7B is a front view that schematically shows another example of the integral-type ceramic block 500.

In the ceramic block 50 and the ceramic block 500 which are shown in FIGS. 7A and 7B, a cross-sectional shape of every through hole, including through holes that are formed in the vicinity of the outer peripheral face of the ceramic block, is a substantially square, and the irregularities on the outer peripheral face of the ceramic block are formed stepwise along the cross-sectional shape of the through holes in the vicinity of the outer peripheral face of the ceramic block.

The ceramic blocks 50 and 500 as described above have the substantially same structure as that of the honeycomb structural body 10 shown in FIG. 3 as well as that of the honeycomb structural body 30 shown in FIG. 5, except for the shape of the irregularities that are formed on the respective outer peripheral faces.

The material for porous ceramic constituting the honeycomb structural body of the present invention is not particularly limited, and examples thereof may include nitride ceramics such as aluminum nitride, silicon nitride, boron nitride, and titanium nitride, carbide ceramics such as silicon carbide, zirconium carbide, titanium carbide, tantalum carbide, and tungsten carbide, oxide ceramics such as alumina, zirconia, cordierite, and mullite, and a silicon carbide-silicon compound. However, in the case where the honeycomb structural body of the present invention is the above-mentioned aggregate-type honeycomb structural body, silicon carbide-natured ceramic, having high thermal resistance, excellent mechanical properties and high thermal conductivity, is most desirably used as the material for porous ceramic. It is to be noted that ceramic containing about 60 wt % or more of silicon carbide is regarded as silicon carbide-natured ceramic. Further, in the case where the honeycomb structural body of the present invention is the above-mentioned integral-type honeycomb structural body, cordierite is desirably used as the material for porous ceramic since it can be formed at low cost, has a relatively small thermal expansion coefficient, and is not oxidized during use.

Although not particularly limited, the porosity of the ceramic block constituting the honeycomb structural body of the present invention is desirably at least about 20% and at most about 80%, more desirably about 50% or more. In the case where the honeycomb structural body of the present invention is used as a honeycomb filter for purifying exhaust gases, the porosity of less than about 20% might cause immediate clogging, whereas the porosity exceeding about 80% might cause the strength of the ceramic block to be lowered, resulting in easy breakage of the ceramic block.

Further, the honeycomb structural body having high porosity of about 50% or more is normally susceptible to thermal shock, but the one in the present invention is resistant to thermal shock and thus expected to exert a further significant effect.

It is to be noted that the above-mentioned porosity can be measured by a known method such as a mercury porosimetry, Archimedes method, a measuring method using a scanning electron microscope (SEM), or the like.

Further, the average pore diameter of the ceramic block is desirably about 5 to 100 μm. In the case where the honeycomb structural body of the present invention is used as a honeycomb filter for purifying exhaust gases, the average pore diameter of less than about 5 μm might cause particulates to easily clog the pores, whereas the average pore diameter exceeding about 100 μm might cause particulates to pass through the pores, resulting in that the honeycomb structural body fails to collect the particulates and thus cannot function as a filter in some cases.

Although not particularly limited, the particle size of ceramic to be used in manufacturing the ceramic block is desirably less likely to shrink in a subsequent firing process, and for example, a compound, prepared by combining 100 parts by weight of powder having an average particle size of about 0.3 to 50 μm and about 5 to 65 parts by weight of powder having an average particle size of about 0.1 to 1.0 μm, is desirably used. By combining the ceramic powders having the above-mentioned respective particle sizes at the above-mentioned blending ratio, it is possible to manufacture a ceramic block made of porous ceramic.

While in the case where the honeycomb structural body of the present invention is the aggregate-type honeycomb structural body shown in FIG. 3, a plurality of porous ceramic members are bound to one another through the sealing material layer which functions as an adhesive, the material constituting the sealing material (adhesive) layer is not particularly limited, and examples thereof may include materials made of an inorganic binder, an organic binder, an inorganic fiber and/or an inorganic particle. It is to be noted that, as described above, the material constituting the sealing material (coating) layer on the outer peripheral face of the ceramic block in the honeycomb structural body of the present invention may be the same as, or different from, the material for the above-mentioned sealing material (adhesive) layer. Further, when the material for the sealing material (coating) layer is the same as that for the sealing material (adhesive) layer, the respective blending ratios of those materials may be the same or different.

Examples of the inorganic binder may include silica sol, alumina sol and the like. Each of these may be used alone or two or more kinds of these may be used in combination. Among the above-mentioned inorganic binders, silica sol is desirably used.

Examples of the organic binder may include polyvinyl alcohol, methyl cellulose, ethyl cellulose, carboxymethyl cellulose and the like. Each of these may be used alone or two or more kinds of these may be used in combination. Among the above-mentioned organic binders, carboxymethyl cellulose is desirably used.

Examples of the inorganic fiber may include ceramic fibers such as silica-alumina, mullite, alumina, and silica. Each of these may be used alone or two or more kinds of these may be used in combination. Among the above-mentioned inorganic fibers, alumina fiber and silica-alumina fiber are desirably used. The lower limit value of the fiber length of the inorganic fiber is desirably about 5 μm. The upper limit value of the fiber length of the inorganic fiber is desirably about 100 mm, more desirably about 100 μm. The fiber length of less than about 5 μm might prevent improvement in elasticity of the sealing material layer. Further, the fiber length exceeding about 100 mm might cause the inorganic fiber to tend to be constituted like a fluff ball, and cause deterioration in dispersion with the inorganic particles in some cases. The fiber length exceeding about 100 μm might make it difficult to make the sealing material layer thin.

Examples of the inorganic particle may include carbides, nitrides and the like, and specific examples thereof may include inorganic powders or whiskers, made of silicon carbide, silicon nitride, boron nitride and the like. Each of these may be used alone, or two or more kinds of these may be used in combination. Among the above-mentioned inorganic particles, silicon carbide, having superior thermal conductivity, is desirably used.

In the honeycomb structural body of the present invention, when predetermined through holes among the through holes formed in the ceramic block are sealed by the plug at one end of the ceramic block while the through holes that are not sealed at the one end of the ceramic block are sealed by the plug at the other end thereof, the honeycomb structural body of the present invention functions as a honeycomb filter for purifying exhaust gases.

Namely, exhaust gases having flown into one through hole in the honeycomb filter according to the present invention are allowed to pass thorough the wall portion that separates the through holes, and then discharged from another through hole to the outside. At this time, particulates contained in the exhaust gases are collected in the wall portion, so that the exhaust gases are purified.

In the honeycomb filter according to the present invention, in the case where the honeycomb structural body of the present invention is the above-mentioned aggregate-type honeycomb structural body, the partition wall that separates the through holes in the porous ceramic member function as a filter for collecting particles. Namely, part of the wall portion in the honeycomb structural body of the present invention functions as a filter for collecting particles. In contrast, in the case where the honeycomb structural body of the present invention is the above-mentioned integral-type honeycomb structural body, the entire wall portion in the honeycomb structural body functions as a filter for collecting particles. It should be noted that since the honeycomb structural body of the present invention, which functions as the honeycomb filter for purifying exhaust gases, functions in the same manner as a known honeycomb filter for purifying exhaust gases, a detailed description thereof is omitted.

In the honeycomb filter according to the present invention, the material for constituting the plug is not particularly limited, and examples thereof may include the same materials as the above-mentioned materials for porous ceramic that constitutes the honeycomb structural body of the present invention.

Moreover, in pores in the honeycomb structural body of the present invention, a catalyst, capable of converting CO, HC, $NO_x$ and the like that are contained in exhaust gases, may be supported.

With such a catalyst supported, the honeycomb structural body of the present invention functions as a catalyst converter for converting CO, HC, $NO_x$ and the like that are contained in exhaust gases.

The catalyst is not particularly limited, and examples thereof may include noble metals such as platinum, palladium, and rhodium. A catalyst made of the above-mentioned noble metal is a so-called three way catalyst, and the honeycomb structural body of the present invention, in which such a three way catalyst is supported, functions in the same manner as a known catalyst converter. Accordingly, a detailed description of the case where the honeycomb structural body of the present invention also functions as a catalyst converter is omitted.

However, the catalyst that can be supported in the honeycomb structural body of the present invention is not limited to the above-mentioned noble metals, and an arbitrary catalyst can also be supported as long as capable of converting CO, HC, $NO_x$ and the like that are contained in exhaust gases.

Further, in the honeycomb structural body of the present invention, the catalyst may be supported in the pores while predetermined through holes are sealed by the above-mentioned plug. In this case, the honeycomb structural body of the present invention functions as the above-mentioned honeycomb filter for purifying exhaust gases, as well as functions as a catalyst converter for converting CO, HC, $NO_x$ and the like that are contained in exhaust gases.

As described above, the honeycomb structural body of the present invention is highly resistant to thermal shock because of the irregularities, controlled to a predetermined size, formed on the outer peripheral face of the ceramic block. Even with a high pressure applied from the outer peripheral face of the honeycomb structural body, cracking or breakage does not easily occur therein, and the honeycomb structural body therefore has excellent durability.

The honeycomb structural body of the present invention as described above can be suitably applied to a honeycomb filter for purifying exhaust gases, a catalyst converter or the like.

In the honeycomb structural body of the present invention, it is desirable that the center-of-gravity c1 does not correspond with the center-of-gravity c2. As described above, this honeycomb structural body is referred to as a center-of-gravity disagreement-type honeycomb structural body.

This center-of-gravity disagreement-type honeycomb structural body has high push-out strength. Thus, even when it is incorporated into the casing through the mat-like holding sealing material to serve as an exhaust gas purifying device and used as a catalyst converter or a honeycomb filter (when subjected to thermal shock) for a long period of time, the honeycomb structural body remains firmly incorporated without rattling, having excellent durability.

Employing such a center-of-gravity disagreement-type honeycomb structure, it is easier to manufacture a minute curved-type honeycomb structural body, i.e., a honeycomb structural body in which when at least three points are determined as centers-of-gravities c2 of least square curves of a ceramic block in the length direction of the ceramic block, these centers-of-gravities c2 are not present on a straight line in parallel with the length direction of the ceramic block, or when at least three points are determined as centers-of-gravities c1 of least square curves of the honeycomb structural body in the length direction of the honeycomb structural body, these centers-of-gravities c1 are not present on a straight line in parallel with the length direction of the honeycomb structural body.

Further, when this center-of-gravity disagreement-type honeycomb structural body is used as the exhaust gas purifying device, holding durability increases. Although the exact mechanism for this is not known, it is considered that in the center-of-gravity disagreement-type honeycomb structural body, some locations have good thermal conductivity while other locations have poor thermal conductivity when heat transmits from the central portion to the outer periphery of the filter. Therefore, heat induces fatigue, corrosion, crystallization, or the like of a holding mat in the location having good thermal conductivity to deteriorate holding power, but in the opposite direction, holding power is relatively maintained. It is thus thought that compressive force is applied to the location fatigued with heat, thereby to prevent a decrease in push-out load.

It is to be noted that the distance between c1 and c2 is desirably at least about 0.1 mm and at most about 10.0 mm. When the distance is less than about 0.1 mm, the curves are concentric and hence the push-out strength does not increase. On the other hand, when the distance exceeds about 10.0 mm, the temperature distribution is reversed, and hence the holding power is reversed.

Figure 8A:
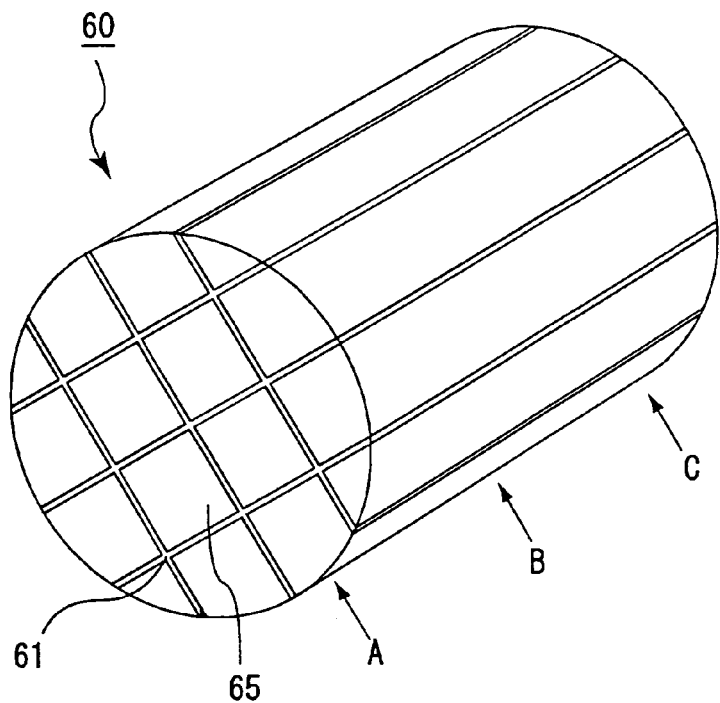
FIG. 8A is a perspective view that schematically shows another example of the honeycomb structural body of the present invention.
Figure 8B:
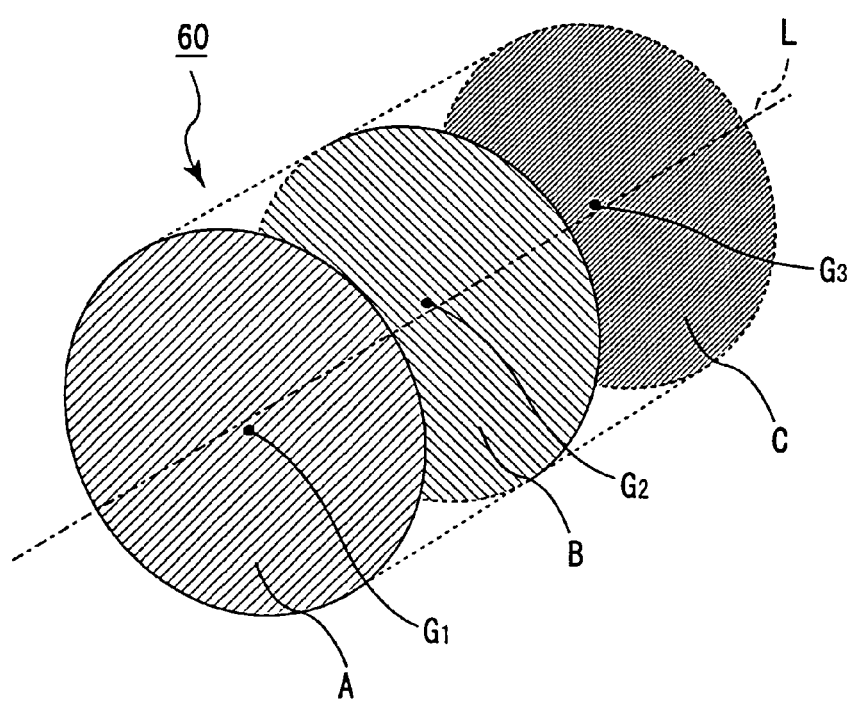
FIG. 8B is a perspective view that schematically shows cross-sectional curves drawn by the contours of cross-sections perpendicular to the length direction of the ceramic block, which are taken at A, B and C of the honeycomb structural body shown in FIG. 8A.

FIG. 8A is a perspective view that schematically shows one example of a ceramic block for use in the minute curved-type honeycomb structural body of the present invention, and FIG. 8B is a perspective view that schematically shows cross-sectional curves drawn by contours of cross-sections perpendicular to the length direction of the ceramic block, which are taken at A, B and C of the honeycomb structural body shown in FIG. 8B.

As shown in FIG. 8A, a minute curved-type honeycomb structural body 60 includes a pillar-shaped ceramic block configured by combining a plurality of porous ceramic members 65, in which a number of through holes are placed in parallel with one another in the length direction with a partition wall interposed therebetween, to one another through sealing material (adhesive) layer 61. Namely, the minute curved-type honeycomb structural body 60 has the substantially same structure as that of the honeycomb structural body 10 shown in FIG. 3, which is an aggregate-type honeycomb structural body.

In the minute curved-type honeycomb structural body, irregularities are formed on the outer peripheral face of the ceramic block. In the honeycomb structural body of the present invention, as described above using FIGS. 4A to 4C and FIGS. 7A and 7B, the irregularities on the outer peripheral face of the ceramic block may be formed by partially removing the through holes constituting the ceramic block to expose the remaining portion at the outer peripheral face, or the irregularities may be formed stepwise.

Further, the size of the irregularities that are formed on the outer peripheral face of the ceramic block is desirably controlled to the same size of the irregularities that are formed on the honeycomb structural body of the present invention. With this size control, the honeycomb structural body has excellent isostatic strength.

As described above, the minute curved-type honeycomb structural body is a honeycomb structural body in which when at least three points are determined as centers-ofgravities c2 of least square curves (hereinafter, also referred to as cross-sectional curves) of the ceramic block in the length direction of a ceramic block, these centers-of-gravities c2 are not present on a straight line in parallel with the length direction of the ceramic block, or a honeycomb structural body in which when at least three points are determined as centers-of-gravities c1 of least square curves of the honeycomb structural body in the length direction of the honeycomb structural body, these centers-of-gravities c1 are not present on a straight line in parallel with the length direction of the honeycomb structural body.

That is to say, as shown in FIG. 8B, the centers-of-gravities c2-1, c2-2 and c2-3 of the least square curves A, B and C, which are determined by the least square method based on points constituting contours of cross-sectional sections perpendicular to the length direction of the ceramic block in the honeycomb structural body 60 are not present on a straight line L in parallel with the length direction of the ceramic block. Such a minute curved-type honeycomb structural body has a high push-out strength and excellent durability.

The studies conducted by the present inventor have revealed that push-out strength of a honeycomb structural body is greatly concerned with a position of a center-of-gravity of a cross-sectional curve drawn by the contour of a cross-section perpendicular to the length direction of a ceramic block in the honeycomb structural body, and push-out strength of the honeycomb structural body becomes excellent when the center-of-gravity c2 of one cross-sectional curve and the center-of-gravity c2 of another cross-sectional curve in the ceramic block are positioned differently within a predetermined range with respect to a straight line in parallel with the length direction of the ceramic block.

Herein, "push-out strength of the honeycomb structural body" means strength limitations with which a honeycomb structural body, being held and fixed by holding the entire outer peripheral face of the ceramic block by a predetermined member, can be resistant to an external force, such as a pressure or the like, to be applied from the one end face of the honeycomb structural body, without causing displacement thereof.

The reason for this is not clear, but may be considered as follows.

When an external force, such as a pressure or the like, is applied to the one end face of the honeycomb structural body being held and fixed by holding the entire outer peripheral face of the honeycomb structural body by a predetermined member, a stress is generated inside the honeycomb structural body, attributed to the external force, from one end face of the ceramic block to the other end face thereof in the honeycomb structural body.

It is considered that, at this time, if a center-of-gravity of one cross-sectional curve of the ceramic block and a center-of-gravity of another cross-sectional curve thereof are present on a straight line in parallel with the length direction of the ceramic block, the stress generated in the ceramic block is transmitted straight from the one end face of the ceramic block to another end face thereof, thereby increasing a force that acts in between the honeycomb structural body and the member for holding the honeycomb structural body. As a result, the push-out strength of the honeycomb structural body decreases.

It is considered, on the other hand, that when the center-of-gravity c2 of one cross-sectional curve and the center-of-gravity c2 of another cross-sectional curve of the ceramic block are not present on a straight line in parallel with the length direction of the above ceramic block, the stress generated in the ceramic block is dispersed while transmitted from the one end face of the ceramic block to another end face thereof, thereby decreasing a force that acts in between the honeycomb structural body and the member for holding the honeycomb structural body. As a result, the push-out strength of the honeycomb structural body increases.

In order to increase the push-out strength of the minute curved-type honeycomb structural body as described above, positional dispersions of centers-of-gravities of cross-sectional curves perpendicular to the length direction of the ceramic block need to be controlled to a predetermined range. In the following, the positional dispersions of centers-of-gravities of cross-sectional curves are specifically described using the honeycomb structural body 60 shown in FIGS. 8A and BB, and the like.

The positional dispersions of the centers-of-gravities c2 of the cross-sectional curves perpendicular to the length direction of the ceramic block in the minute curved-type honeycomb structural body can be determined by first determining positional data concerning the center-of-gravity c2-1 of the cross-sectional curve A, positional data concerning the center-of-gravity c2-2 of the cross-sectional curve B and positional data concerning the center-of-gravity c2-3 of the cross-sectional curve C, of the minute curved-type honeycomb structural body 60, and then drawing a least square straight line (not shown), determined from the respective positional data concerning the centers-of-gravities c2-1, c2-2 and c2-3.

The method for determining positional data concerning the center-of-gravity c2 of the cross-sectional curve is not particularly limited, and positional data can for example be measured using the above-mentioned three dimensional measurement device.

Further, the number of the positional data to be determined, concerning the centers-of-gravities c2 of cross-sectional curves, is not limited as long as it is three or more. This is because, when the number of data to be measured, concerning the centers-of-gravities c2 of the cross-sectional curves, is less than three, a least square straight line showing the centers of similitude of the cross-sectional curves perpendicular to the length direction of the ceramic block cannot be drawn.

It is to be noted that, although the number of positional data to be measured, concerning the centers of similitude of the cross-sectional curves, is not limited as long as it is three or more, the number of the positional data is desirably five or more, and each thereof is desirably spaced equally in measurement. This is because, with each data equally spaced, it is possible to more precisely determine positional dispersions of centers-of-gravities of cross-sectional curves perpendicular to the length direction of the ceramic block.

Next, a distance $r_1$ between the center-of-gravity c2-1 of the cross-sectional curve A and the least square straight line, a distance $r_2$ between the center-of-gravity c2-2 of the cross-sectional curve B and the least square straight line, and a distance $r_3$ between the center-of-gravity c2-3 of the cross-sectional curve C and the least square straight line are determined, respectively. These $r_1$ to $r_3$ are determined from the lengths of perpendicular lines dropped from the respective centers-of-gravities c2-1 to c2-3 to the least square straight line.

Subsequently, a distance D3-1 from the center-of-gravity c2-1 to the outermost point of the cross-sectional curve A, a distance D3-2 from the center-of-gravity c2-2 to the outermost point of the cross-sectional curve B, and a distance D3-3 from the center-of-gravity c2-3 to the outermost point of the cross-sectional curve C are determined, respectively.

In the honeycomb structural body of the present invention, a ratio of a distance between the center-of-gravity and the least square straight line drawn by the least square method based on the positional data of the center-of-gravity to a distance between the center-of-gravity and the outermost point of the least square curve is desirably in a range of about 0.1% to 3%.

Namely, in the honeycomb structural body 60, $r_1$ with respect to D3-1, $r_2$ with respect to D3-2, and $r_3$ with respect to D3-3 are desirably in a range of about 0.1% to 3%, respectively. With the above ratio of less than about 0.1%, there are almost no positional dispersions of the centers-of-gravities of the cross-sectional curves perpendicular to the length direction of the ceramic block, which might cause lowering of the push-out strength of the honeycomb structural body, whereas, with the above ratio exceeding 3%, the non-uniformity of the surface thickness of the ceramic block increases, and for example when the honeycomb structural body of the present invention is installed in a casing through a mat-like holding sealing material so as to be used as an exhaust gas purifying device, it rattles during use, which might cause lowering the push-out strength, leading to poor durability. Further, the installation of the honeycomb structural body in the casing itself becomes difficult.

Examples of other constitutions of the minute curved-type honeycomb structural body and examples of the materials constituting this honeycomb structural body, and the like, are the same as those of the above-mentioned honeycomb structural body of the present invention, which was described as an aggregate-type honeycomb structural body, and the detailed description of the minute curved-type honeycomb structural body is thus omitted.

It should be noted that the center-of-gravity disagreement-type honeycomb structural body and the minute curved-type honeycomb structural body may also be allowed to function as a honeycomb structural body for purifying exhaust gases or a catalyst converter, as in the case of the above-mentioned honeycomb structural body of the present invention.

As described above, in the minute curved-type honeycomb structural body, irregularities are formed on the outer peripheral face of the ceramic block therein, and a center-of-gravity of a cross-sectional curve drawn by the contour of a cross-section perpendicular to the length direction of the ceramic block and a center-of-gravity of another cross-sectional curve drawn by the contour of another cross-section perpendicular to the length direction of the ceramic block are not present on a straight line in parallel with the length direction of the ceramic block, and positional dispersions of the centers-of-gravities are controlled to a predetermined range, leading to excellent push-out strength and durability.

Accordingly, for example, even when the minute curved-type honeycomb structural body is installed, as an exhaust gas purifying device, in a casing through a mat-like holding sealing material or the like and a pressure, such as exhaust gas, is applied from the one end face side of the honeycomb structural body, the honeycomb structural body is hardly displaced in the casing.

Such a minute curved-type honeycomb structural body can also be suitably used as a honeycomb filter for purifying exhaust gases or a catalyst converter.

Next, the first aspect of the manufacturing method of the honeycomb structural body according to the present invention will be described.

The first aspect of the manufacturing method of the honeycomb structural body according to the present invention is a manufacturing method of a honeycomb structural body comprising a pillar-shaped ceramic block in which a plurality of porous ceramic members are combined with each other through a sealing material (adhesive) layer, said porous ceramic member including a large number of through holes placed in parallel with one another in a length direction with a partition wall interposed therebetween, wherein the method comprises a step of: processing an outer peripheral face of a ceramic dried body obtained by drying a ceramic molded body that contains a ceramic material constituting each of said porous ceramic members so as to form a plurality of kinds of ceramic dried bodies having different shapes.

A first aspect of the manufacturing method of a honeycomb filter of the present invention is a manufacturing method of a honeycomb structural body comprising a pillar-shaped ceramic block in which a plurality of porous ceramic members are combined with each other through a sealing material (adhesive) layer, said porous ceramic member including a large number of through holes placed in parallel with one another in a length direction with a partition wall interposed therebetween. Namely, the structure of the honeycomb structural body manufactured by the first aspect of the manufacturing method of the honeycomb structural body of the present invention is the structure of the above-mentioned aggregate-type honeycomb structural body.

In the first aspect of the manufacturing method of the honeycomb structural body of the present invention, a ceramic molded body formation process is first performed, in which a mixed composition including a ceramic material constituting the porous ceramic members is prepared and the obtained mixed composition is subjected to extrusion molding to form rectangular columnar ceramic molded bodies.

Although not particularly limited, the above-mentioned mixed composition desirably allows the honeycomb structural body after manufactured to have a porosity of at least about 20% and at most about 80%, and examples of the mixed composition may include a mixture of ceramic powder, a binder and a dispersant solution.

The ceramic powder is not particularly limited, and examples thereof may include powders of oxide ceramics such as cordierite, alumina, silica, and mullite, carbide ceramics such as silicon carbide, zirconium carbide, titanium carbide, tantalum carbide, and tungsten carbide, nitride ceramics such as aluminum nitride, silicon nitride, boron nitride, and titanium nitride, and a silicon carbide-silicon compound. Among these, silicon carbide, having high thermal resistance, excellent mechanical properties and high thermal conductivity, is most desirably used.

Although the particle size of the above-mentioned ceramic powder is not particularly limited, ceramic powder less likely to shrink in a subsequent firing process is preferably used, and for example, a compound prepared by combining 100 parts by weight of powder having an average particle size of about 0.3 to 50 μm and about 5 to 65 parts by weight of powder having an average particle size of about 0.1 to 1.0 μm, is preferably used.

The binder is not particularly limited, and examples thereof may include methylcellulose, carboxymethyl cellulose, hydroxyethyl cellulose, polyethylene glycol, phenol resins, epoxy resins and the like.

A blending ratio of the above-mentioned binders is not particularly limited, but normally, the blending ratio is preferably about 1 to 10 parts by weight with respect to 100 parts by weight of the ceramic powder.

The dispersant solution is not particularly limited, and examples thereof may include an organic solvent such as benzene or the like, alcohol such as methanol or the like, water and the like. The dispersant solution is blended in an appropriate amount such that the viscosity of the mixed composition is set within a certain range.

Further, a dispersant agent may be contained together with the ceramic powder, the binder and the dispersant solution. The dispersant agent is not particularly limited, and examples thereof may include phosphate ester compounds such as trimethyl phosphate, triethyl phosphate, tributyl phosphate, tris(2-chloroethyl)phosphate, triphenyl phosphate, tricresyl phosphate, and cresyl diphenyl phosphate. Further, about 0.1 to 5 parts by weight of the dispersant agent is preferably added with respect to 100 parts by weight of the ceramic powder.

The above-described ceramic powder, binder, dispersant solution and the like are mixed by an attritor or the like, and sufficiently kneaded by a kneader or the like, to prepare the above-mentioned mixed composition.

The mixed composition is subjected to extrusion molding, to form pillar-shaped molded bodies each comprising a plurality of rectangular columnar through holes that are placed in parallel with one another in the length direction with a partition wall interposed therebetween, and each of the molded bodies is cut into a predetermined length to form rectangular columnar ceramic molded bodies each having the substantially same shape as that of the porous ceramic member 20 shown in FIG. 4A.

In the first aspect of the manufacturing method of the honeycomb structural body of the present invention, next, the above-mentioned ceramic molded body is dried by using a microwave dryer, a hot-air dryer, a dielectric dryer, a decompression dryer, a vacuum dryer, a freeze dryer or the like, to form a ceramic dried body.

Subsequently, an outer periphery processing process is performed, in which the ceramic dried body is subjected to outer peripheral processing, to form a plurality of kinds of ceramic dried bodies having different shapes. Specifically, a portion to become through holes is partially removed to expose the remaining portion at the outer peripheral face to form a ceramic dried body with irregularities formed thereon, which has the substantially same shape as that of either the porous ceramic members 200 or 210, shown in FIGS. 4B and 4C. Formation of the ceramic dried body in such a manner enables the subsequent processes to be performed: after a later-mentioned firing process, a plurality of kinds of porous ceramic members having different shapes are manufactured, and in a subsequent block formation process, those plurality of kinds of porous ceramic members having different shapes are combined and bonded to form a substantially cylindrical ceramic block having irregularities on the outer peripheral face thereof.

With regard to the method for processing the outer periphery of the ceramic dried body, the method for forming a plurality of kinds of ceramic dried bodies having different shapes is not particularly limited, and examples thereof may include: a method disclosed in JP-A 2000-001718, in which a cylindrical cutting member with a grind stone formed at one end thereof, having an inner diameter adjusted to the substantially same length as that of the external diameter of a ceramic block, is shifted in the length direction while rotated along the center of the cylinder as a rotation axis, so as to partially cut off the outer peripheries of rectangular columnar ceramic dried bodies from the one end face side thereof; and a method disclosed in JP-A 2000-001719, in which a cylindrical cutting member with a grind stone disposed in a portion including the outer periphery of a cylindrical base metal part, is brought into contact with the outer periphery of rectangular columnar ceramic dried bodies and shifted in the length direction of the ceramic dried bodies while rotated about the center of the base metal part as a rotation axis, so as to partially cut off the outer peripheries of the ceramic dried bodies.

In above outer peripheral processing process, the size of irregularities that are formed on part of the outer peripheral face of the ceramic dried body is determined, as appropriate, according to the size of an aimed honeycomb structural body, but it is desirable to adjust the size of the irregularities such that a size of irregularities that are formed on the outer peripheral face of a ceramic block, to be formed after a later-mentioned ceramic block formation process, is the same as the size of the irregularities that are formed on the outer peripheral face of the ceramic block in the above-mentioned honeycomb structural body of the present invention. This is because the honeycomb structural body of the present invention, which has excellent strength (durability) to thermal shock, can be manufactured by the first aspect of the manufacturing method of the honeycomb structural body of the present invention.

It should be noted that, in the case of performing a later-mentioned coating layer formation process, irregularities may be formed on the outer peripheral faces of the ceramic dried bodies such that the size of the irregularities that are formed on the outer peripheral face of the ceramic block to be formed in the ceramic block formation process is larger than the size of the irregularities that are formed on the outer peripheral face of the ceramic block in the honeycomb structural body of the present invention, and in the subsequent coating layer formation process, the size of the irregularities having been formed on the outer peripheral faces of the ceramic dried bodies may be adjusted by a coating layer to be formed on the outer peripheral face of the ceramic block.

Next, a degreasing process is performed, in which the above-mentioned plurality of kinds of ceramic dried bodies having different shapes are heated to about 150° C. to 700° C. to remove a binder contained in the ceramic dried bodies so as to obtain ceramic degreased bodies.

The degreasing process of the ceramic dried body is normally performed by placing the ceramic dried body on a jig for degreasing, and then installing the ceramic dried body in a degreasing furnace, to be heated to about 300° C. to 650° C. under an oxygen-containing atmosphere. This leads to sublimation, decomposition and elimination of most of the above binder and the like.

A firing process is then performed, in which the ceramic dried body is fired by heating to about 2000° C. to 2200° C. under an atmosphere of an inert gas such as nitrogen, argon and the like and the ceramic powder is then sintered, to manufacture a porous ceramic member.

It is to be noted that the sequent processes from the degreasing process to the firing process is preferably performed such that the ceramic dried body is placed on the jig for firing and remains placed thereon during the degreasing process and the firing process. This allows the degreasing process and the firing process to be effectively performed, and can prevent the ceramic dried body from being damaged when being placed on a different jig or in some other occasions.

The porous ceramic member is desirably made of a ceramic crystal having the lower limit average particle size of about 2 μm, more desirably about 10 μm, and the upper limit average particle size of about 150 μm, more desirably about 70 µm. With the average particle size of the ceramic crystal being less than about 2 µm, a pore size of pores present inside the porous ceramic member becomes excessively small to immediately cause clogging, thereby making it difficult for the porous ceramic member to function as a filter. On the other hand, with the average particle size of the ceramic crystal exceeding about 150 µm, the pore diameter of the pores present inside the porous ceramic member becomes excessively large, and thereby the strength of the porous ceramic member might decrease. Moreover, formation of a porous ceramic member having a predetermined ratio of opened pore and having a ceramic crystal with an average diameter exceeding about 150 µm itself is not easily achieved.

The average pore diameter of the porous ceramic member is desirably about 1 to 40 µm.

Next, a ceramic block formation process is performed, in which a plurality of kinds of porous ceramic members having different shapes, as thus manufactured, are combined through a sealing material (adhesive) paste to form a substantially cylindrical ceramic block.

In this ceramic block formation process, for example, the sealing material (adhesive) paste is applied on the substantially entire surface of each side face of the porous ceramic member, using a brush, a squeegee, a roll or the like, to form a sealing material (adhesive) paste layer having a predetermined thickness.

After the formation of this sealing material (adhesive) paste layer, a process for bonding another porous ceramic member is successively repeated to form a cylindrical ceramic laminated body having a predetermined size, like the honeycomb structural body 10 shown in FIG. 3.

Herein, the number of porous ceramic members to be combined to one another through the sealing material (adhesive) paste layer is determined, as appropriate, based on the shape, size and the like of an aimed ceramic block.

It should be noted that porous ceramic members having the shapes shown in FIGS. 4B and 4C are desirably used in the vicinity of the outer periphery of the ceramic laminated body, and porous ceramic members having the shape shown in FIG. 4A is desirably used in the portion other than the vicinity of the outer periphery of the ceramic laminated body. In this manner, a cylindrical ceramic block can be formed. Irregularities on the outer peripheral face of such a ceramic laminated body are formed by partially cutting off through holes to expose the remaining portion at the outer peripheral face.

Next, the ceramic laminated body as thus formed is heated for example under conditions of a temperature of 50° C. to 150° C. and the heating time of one hour, to dry and solidify the sealing material (adhesive) paste layer so as to form a sealing material (adhesive) layer, and thereafter, a ceramic block, configured by combining a plurality of porous ceramic members to one another through the sealing material (adhesive) layer, is formed so that an aggregate-type honeycomb structural body is manufactured.

Examples of the material constituting the sealing material (adhesive) paste may be the same as the examples of the material constituting the sealing material (adhesive) layer, mentioned in the explanation of the honeycomb structural body of the present invention.

Although a small amount of moisture, solvent and the like may further be contained in the sealing material (adhesive) layer having been formed of the sealing material (adhesive) paste, most of such moisture, solvent and the like are normally scattered through heating or the like after application of the sealing material (adhesive) paste.

In the first aspect of the manufacturing method of the honeycomb structural body of the present invention, after formation of the ceramic block, a sealing material (coating) layer formation process may be performed, in which the sealing material (coating) layer is formed on the outer peripheral face of the ceramic block. After the sealing material (coating) layer is formed, the outer periphery portion is processed to control the size of irregularities that are formed on the outer peripheral face of the honeycomb structural body.

Although the material constituting the sealing material (coating) layer is not particularly limited, those including heat resistant materials, such as inorganic fibers, and inorganic binders, are desirably used. The sealing material (coating) layer may be constituted of the same material as the above-mentioned material constituting the sealing material (adhesive) layer.

The method for forming the sealing material (coating) layer is not particularly limited, and examples thereof may include the following method: using a supporting member comprising a rotating means, the ceramic block is supported in the direction of the rotating axis and rotated therearound, and a clotted sealing material (coating) paste to become the above-mentioned sealing material (coating) layer is allowed to adhere to the outer periphery of the rotating ceramic block. The sealing material (coating) paste is then stretched using a plate member or the like to form a sealing material (coating) paste layer, which is then dried for example at a temperature of about 120° C. or higher to evaporate moisture, and thereby a sealing material (coating) layer is formed on the outer periphery of the ceramic block.

As described above, according to the first aspect of the manufacturing method of the honeycomb structural body of the present invention, since ceramic, of a brittle material, is not subjected to cutting, it is possible to manufacture a honeycomb structural body including a ceramic block with a structure that irregularities are formed on the outer peripheral face thereof where no chipping occurs, and a plurality of porous ceramic members are bound to one another through sealing material (adhesive) layer.

Further, according to the first aspect of the manufacturing method of the honeycomb structural body of the present invention, adjusting the size of irregularities that are formed on part of the outer peripheral face of ceramic dried bodies in the outer peripheral processing process, or adjusting the thickness of the sealing material (coating) layer formed on the outer peripheral face of the ceramic block in the sealing material (coating) layer formation process, allows manufacturing of the honeycomb structural body of the present invention in which the size of the irregularities that are formed on the outer periphery of the ceramic block is controlled to a predetermined range.

Moreover, in the first aspect of the manufacturing method of the honeycomb structural body of the present invention, a plurality of kinds of ceramic dried bodies having different shapes are previously formed in the outer peripheral processing process, and thereafter, using those ceramic dried bodies, the degreasing process and the firing process are performed to form porous ceramic members which are warped to some degree. Therefore, in the honeycomb structural body which is manufactured while controlling the orientation and the size of the above-mentioned warp of the porous ceramic members by the thickness of the sealing material (adhesive) layer or the like, a center-of-gravity of a cross-sectional curve formed by the contour of a cross-section perpendicular to the length direction of the ceramic block and a center-of-gravity of another cross-sectional curve formed by the contour of another cross-section perpendicular to the length direction of the ceramic block are not present on a straight line in parallel with the length direction of the ceramic block. Namely, it is possible to manufacture a center-of-gravity disagreement-type honeycomb structural body by the first aspect of the manufacturing method of the honeycomb structural body of the present invention.

Next, the second aspect of the manufacturing method of the honeycomb structural body according to the present invention will be described.

The second aspect of the manufacturing method of the honeycomb structural body according to the present invention is a manufacturing method of a honeycomb structural body comprising a pillar-shaped ceramic block in which a plurality of porous ceramic members are combined with each other through a sealing material layer (adhesive layer), said porous ceramic member including a large number of through holes placed in parallel with one another in a length direction with a partition wall interposed therebetween, wherein the method comprises a step of: performing extrusion molding to form ceramic molded bodies having a plurality of kinds of cross-sectional shapes.

A second aspect of the manufacturing method of a honeycomb filter of the present invention is a method of manufacturing a honeycomb structural body comprising a pillar-shaped ceramic block in which a plurality of porous ceramic members are combined with each other through a sealing material layer (adhesive layer), said porous ceramic member including a large number of through holes placed in parallel with one another in a length direction with a partition wall interposed therebetween. Namely, the structure of the honeycomb structural body manufactured by the second aspect of the manufacturing method of the honeycomb structural body of the present invention is the structure of an aggregate-type honeycomb structural body, as in the manufacturing method of the honeycomb structural body of the first aspect of the present invention.

In the second aspect of the manufacturing method of the honeycomb structural body of the present invention, a ceramic molded body formation process is first performed, in which a mixed composition including a ceramic material constituting the porous ceramic members is prepared and ceramic molded bodies having a plurality of kinds of cross-sectional shapes are then formed using the mixed composition.

Namely, in the second aspect of the manufacturing method of the honeycomb structural body of the present invention, the mixed composition is subjected to extrusion molding to form rectangular columnar ceramic molded bodies and ceramic molded bodies with irregularities partially formed on the outer peripheral face thereof.

Herein, the irregularities of the ceramic molded body with the irregularities partially formed on the outer peripheral face thereof may be formed by partially cutting off through holes to expose the remaining portion at the outer peripheral face, as in the case of the porous ceramic members 20, 200 and 210 shown in FIGS. 4A to 4C, or the irregularities may for example be formed stepwise, as in the case of the porous ceramic member constituting the vicinity of the outer periphery of the honeycomb structural body 50 shown in FIG. 7A.

The size of the irregularities that are formed on part of the outer peripheral face of the ceramic molded body is determined, as appropriate, according to the size of an aimed honeycomb structural body, and desirably controlled to the same size as the size of the irregularities that are formed on part of the outer peripheral face of the ceramic dried body in the manufacturing method of the honeycomb structural body of the present invention. This is because the honeycomb structural body of the present invention, which has excellent isostatic strength, can be manufactured by the second aspect of the manufacturing method of the honeycomb structural body of the present invention.

Thereafter, using the formed ceramic molded bodies having a plurality of kinds of cross-sectional shapes, the same drying process, degreasing process, firing process and ceramic block formation process as those in the manufacturing method of the honeycomb structural body of the present invention are performed, and the sealing material (coating) layer formation process is also performed if necessary, to manufacture a honeycomb structural body having irregularities formed on the outer peripheral face of the ceramic block therein.

As described above, according to the second aspect of the manufacturing method of the honeycomb structural body of the present invention, since ceramic, of a brittle material, is not subjected to cutting, it is possible to manufacture a honeycomb structural body including a ceramic block with a structure that irregularities are formed on the outer peripheral face thereof where no chipping occurs, and a plurality of porous ceramic members are bound to one another through sealing material (adhesive) layer.

Further, according to the second aspect of the manufacturing method of the honeycomb structural body of the present invention, adjusting the size of irregularities that are formed on part of the outer peripheral face of ceramic molded bodies in the ceramic molded body formation process, or adjusting the thickness of the sealing material (coating) layer formed on the outer peripheral face of the ceramic block in the sealing material (coating) layer formation process, allows manufacturing of the honeycomb structural body of the present invention in which the size of the irregularities that are formed on the outer periphery of the ceramic block is controlled to a predetermined range.

Moreover, in the second aspect of the manufacturing method of the honeycomb structural body of the present invention, a plurality of kinds of ceramic molded bodies having different shapes are previously formed in the ceramic molded body formation process, and thereafter, using those ceramic molded bodies, the drying process, the degreasing process and the firing process are performed to manufacture porous ceramic members which are warped to some degree. Therefore, in the honeycomb structural body which is manufactured while controlling the orientation and the size of the above-mentioned warp of the porous ceramic members by the thickness of the sealing material (adhesive) layer or the like, a center-of-gravity of a cross-sectional curve formed by the contour of a cross-section perpendicular to the length direction of the ceramic block and a center-of-gravity of another cross-sectional curve formed by the contour of another cross-section perpendicular to the length direction of the ceramic block are not present on a straight line in parallel with the length direction of the ceramic block. Namely, it is possible to manufacture a minute curved-type honeycomb structural body by the second aspect of the manufacturing method of the honeycomb structural body of the present invention.

Next, an exhaust gas purifying device of the present invention is described.

An exhaust gas purifying device of the present invention is installed in a casing connected to an exhaust passage in an internal combustion engine through a mat-like holding sealing material, and the mat-like holding sealing material is placed in the state of filling the recesses on the outer peripheral face of the ceramic block in the honeycomb structural body.

Figure 9:
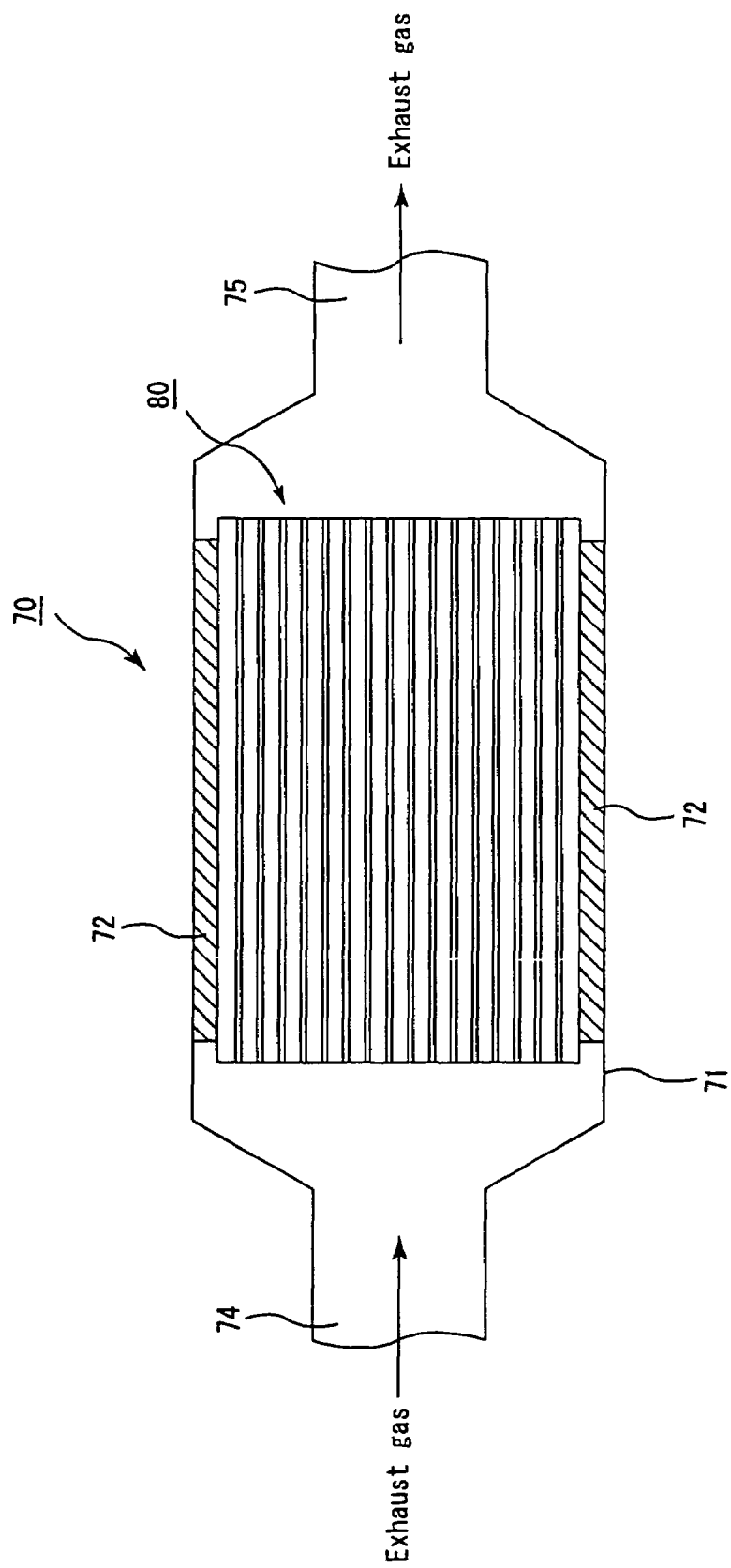
FIG. 9 is a cross-sectional view that schematically shows one example of an exhaust gas purifying device of the present invention.
Figure 10A:
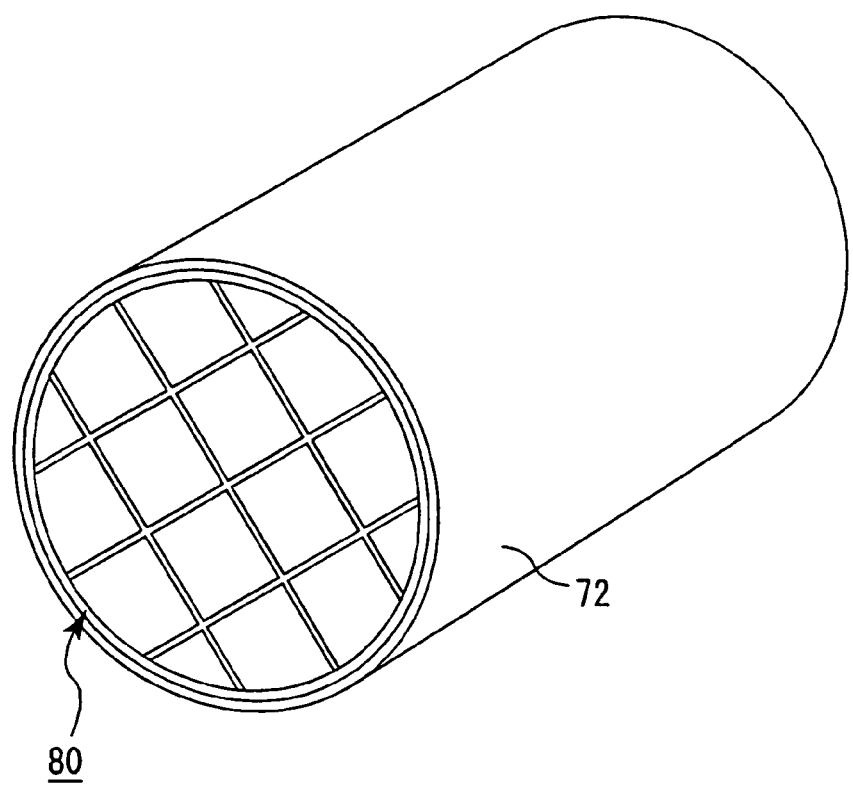
FIG. 10A is a perspective view that schematically shows one example of a honeycomb structural body, wrapped with a mat-like holding sealing material, in the exhaust gas purifying device shown in FIG. 9.
Figure 10B:
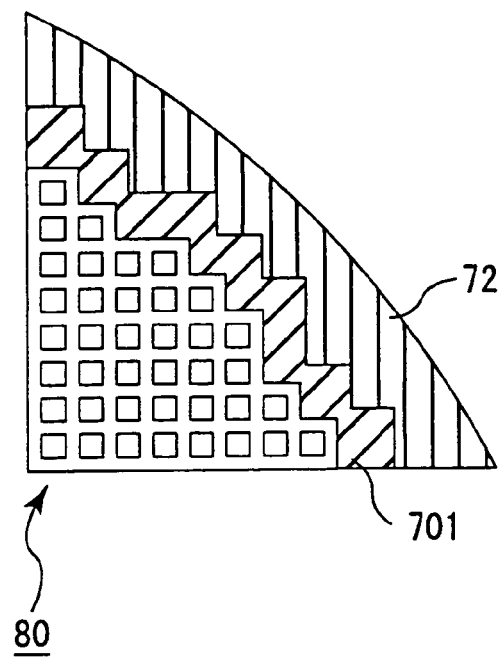
FIG. 10B is a partially enlarged cross-sectional view of the honeycomb structural body shown in FIG. 10A.

FIG. 9 is a cross-sectional view that schematically shows one example of an exhaust gas purifying device of the present invention. FIG. 10A is a perspective view that schematically shows one example of a honeycomb structural body, wrapped with a mat-like holding sealing material, in the exhaust gas purifying device shown in FIG. 9. FIG. 10B is a partially enlarged cross-sectional view of the honeycomb structural body shown in FIG. 10A.

As shown in FIG. 9, an exhaust gas purifying device 70 of the present invention is mainly constituted of a honeycomb structural body 80, a casing 71 that covers the outer face of the honeycomb structural body 80, and a mat-like holding sealing material 72 disposed between the honeycomb structural body 80 and the casing 71. An introduction pipe 74, joined to an internal combustion engine such an engine or the like, is connected to the end of the exhaust gas introducing side of the casing 71 while an exhaust pipe 75 joined to the outside is connected to the other end of the casing 71. Herein, the arrows in FIG. 9 show flows of the exhaust gas.

It is to be noted that, in the exhaust gas purifying device 70 of the present invention, the honeycomb structural body 80 may be the honeycomb structural body of the present invention as shown in FIGS. 3, 5 and 7, or may be the honeycomb structural body of the present invention as shown in FIG. 8.

In the exhaust gas purifying device 70 of the present invention, when the honeycomb structural body 80 functions as a so-called honeycomb filter which collects particulates contained in exhaust gas through a wall portion to purify the exhaust gas, predetermined through holes among through holes that are formed in a ceramic block constituting the honeycomb structural body 80 are sealed by a plug at one end of the ceramic block, whereas through holes, which are not sealed by the plug at the above one end of the ceramic block, are sealed at another end thereof.

Namely, in this case, in the exhaust gas purifying device 70, exhaust gas, discharged from an internal combustion engine such as an engine or the like, is introduced into the casing 71 through the introduction pipe 74, directed to the through holes of the honeycomb structural body 80 (honeycomb filter) to pass through the wall portion (partition wall), in which the exhaust gas is purified with particulates therein collected, and then discharged outside through the exhaust pipe 75.

On the other hand, in the exhaust gas purifying device 70 of the present invention, when the honeycomb structural body 80 functions as a so-called catalyst converter for converting CO, HC, $NO_x$ and the like that are contained in exhaust gases through the wall portion, a catalyst capable of converting CO, HC, $NO_x$ and the like that are contained in exhaust gases, such as noble metals like platinum, palladium, rhodium and the like, is supported on the surface of the wall portion, or in the pores, of the honeycomb structural body 80.

Namely, in this case, in the exhaust gas purifying device 70, exhaust gas, discharged from an internal combustion engine such an engine or the like, is introduced into the casing 71 through the introduction pipe 74, directed to the through holes of the honeycomb structural body 80 (catalyst converter) to pass through the through holes, in which the exhaust gas is converted by contact between a catalyst and CO, HC, $NO_x$ and the like that are contained in the exhaust gas, and then discharged outside through the exhaust pipe 75.

In the exhaust gas purifying device 70 of the present invention, as shown in FIG. 10B, a sealing material (coating material) 701 is formed on irregularities having been formed on the outer peripheral face of the honeycomb structural body 80 (ceramic block), irregularities are also formed on the outer peripheral face of the sealing material (coating material) 701, and the honeycomb structural body 80 (ceramic block) with the sealing material (coating material) 701 formed thereon is then assembled in the casing 71 through the mat-like holding sealing material 72.

With the honeycomb structural body 80 held by the mat-like holding sealing material 72 in the above-mentioned manner, a so-called anchor effect can be obtained between the honeycomb structural body 80 and the mat-like holding sealing material 72 to make the honeycomb structural body 80 and the mat-like holding sealing material 72 resistant to displacement during use of the device, thereby improving durability of the exhaust gas purifying device 70, and also to prevent leakage of exhaust gas from the outer peripheral portion of the honeycomb structural body 80.

Especially in the case where the honeycomb structural body in the exhaust gas purifying device of the present invention is a center-of-gravity disagreement-type honeycomb structural body or a minute curved-type honeycomb structural body, since the center-of-gravity disagreement-type honeycomb structural body and the minute curved-type honeycomb structural body have highly excellent push-out strength, as described above, the honeycomb structural body is not displaced in the direction of the exhaust gas flow even when large pressure is applied to one end face of the honeycomb structural body by the exhaust gas having been flown into the casing through the introduction pipe, and accordingly, the exhaust gas purifying device of the present invention has highly excellent durability.

It is to be noted that, although in FIG. 10B, the irregularities on the outer peripheral face of the ceramic block in the honeycomb structural body 80 are formed stepwise as in the case of the honeycomb structural body 50 shown in FIG. 7A, those irregularities may naturally be formed by partially removing through holes that constitute the ceramic block to expose the remaining portion at the outer peripheral face as shown in FIG. 4 or 5.

The mat-like holding sealing material 72 holds and fixes the honeycomb structural body 80 in the casing 71, as well as functioning as a heat insulating material for keeping the temperature of the honeycomb structural body 80 in use.

The material for constituting this mat-like holding sealing material 72 is not particularly limited, and examples thereof may include inorganic fibers such as crystal alumina fibers, alumina-silica fibers, mullite, and silica fibers, and fibers including one kind or more of those inorganic fibers. Moreover, the above examples also include a non-expansive mat substantially including no vermiculite, and a low-expansive mat including a small amount of vermiculite, and the non-expansive mat substantially including no vermiculite is preferably used.

Further, the mat-like holding sealing material 72 desirably contains alumina and/or silica. This is because such a structure provides the mat-like holding sealing material 72 with excellent thermal resistance and durability. In particular, the mat-like holding sealing material 72 desirably contains about 50% by weight or more of alumina. This is because such a structure enhances elastic force of the mat-like holding sealing material 72 even at high temperatures of about 900° C. to 950° C., thereby to improve strength for holding the honeycomb structural body 80.

Furthermore, the mat-like holding sealing material 72 is desirably subjected to needle punching. This is because, with this needle punching performed, fibers constituting the holding sealing material 72 are tangled with one another to enhance elastic force, thereby to improve strength for holding the honeycomb structural body 80.

As shown in FIG. 10A, the mat-like holding sealing material 72 made of the materials as described above desirably wraps the honeycomb structural body 80 so as to cover the subsequently entire outer peripheral face thereof. This is because such a structure allows the mat-like holding sealing material 72 to uniformly hold the honeycomb structural body 80, resulting in excellent stability in holding the honeycomb structural body 80.

Further, the mat-like holding sealing material of the present invention may be made of a non-expansive mat.

As described above, in the exhaust gas purifying device of the present invention, the honeycomb structural body of the present invention is assembled in the casing, with the mat-like holding sealing material filling the recesses on the outer peripheral face of the ceramic block in the honeycomb structural body, and hence a so-called anchor effects is generated between the ceramic block and the mat-like holding sealing material, resulting in excellent stability in holding the honeycomb structural body.

Therefore, the exhaust gas purifying device of the present invention has excellent isostatic strength and push-out strength. Even during use of the exhaust gas purifying device for a long period of time, an increase in pressure of exhaust gas flown into the casing, a temperature rise in the honeycomb structural body, or the like does neither decrease strength for holding the honeycomb structural body nor displace or rattle the honeycomb structural body. Accordingly, the exhaust gas purifying device of the present invention has excellent strength against thermal shock, and excellent durability as well.

EXAMPLES

In the following, the present invention will be described in detail by way of examples; however, the present invention is not intended to be limited by these examples.

Example 1

70 parts by weight of α-type silicon carbide powder having an average particle size of 30 μm, 30 parts by weight of α-type silicon carbide powder having an average particle size of 0.28 μm, 5 parts by weight of methyl cellulose, 4 parts by weight of a dispersing agent, and 20 parts by weight of water were blended, and then mixed in a ball mill for 5 hours to prepare a uniform mixed composition.

An extrusion-molding machine was filled with this resultant mixed composition, and at a push-out rate of 2 cm/min, a rectangular pillar-shaped ceramic molded body made of silicon carbide in honeycomb form was formed, which was almost the same as the porous ceramic member 20 shown in FIG. 4A. The ceramic molded body had a size of 35 mm×35mm×300 mm, the number of through holes of 31/cm$^2$ and a thickness of the partition wall of 0.35 mm.

The ceramic molded body was dried by a dryer, such as a microwave drier or a hot-air drier, to form a ceramic dried body made of silicon carbide, and outer peripheral processing is performed for partially cutting off the outer periphery of the ceramic dried body, using a cutting member having a grind stone disposed on a portion including the outer peripheral portion of a disc-shaped plate metal, to form a ceramic dried body as shown in FIGS. 4B and 4C, in which the rectangular pillar was partially cut off and part of through holes was exposed at that cut-off portion.

The ceramic dried bodies were degreased at 450° C., and fired by heating at 2200° C. to manufacture a plurality of kinds of porous ceramic members, having different shapes and made of silicon carbide. Herein, in order to prevent warping of porous ceramic member to be manufactured, the outer peripheral portion of the ceramic dried body was held and fixed by a fixing jig having a holding portion with the substantially same shape as the outer shape of the ceramic dried body, and the temperature was slowly raised.

Next, using a heat resistant sealing material (adhesive) paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, the plurality of kinds of porous ceramic members were combined with one another in large number, and the sealing material (adhesive) paste was then dried to form a cylindrical ceramic block.

With regard to the ceramic block formed as described above, the M2 value was measured by the method described as to the honeycomb structural body of the present invention in the above embodiment, using a three dimensional measurement device (BH-V507, manufactured by Mitsutoyo Corp.). As a result, the M2 value was 0.0 mm.

The outer peripheral face of the ceramic block was then subjected to grinding so as to set the M2 value to 0.5 mm.

Thereafter, a sealing material (coating) layer, having a shape along the irregularities formed on the outer peripheral face of the ceramic block and the same composition as that of the above-mentioned sealing material (adhesive) paste, was formed on the outer peripheral face of the ceramic block, so that a number of porous ceramic members made of silicon carbide were bound to one another thorough the sealing material (adhesive) layer, and a honeycomb structural body which was constituted by including the ceramic block having the irregularities formed on the outer peripheral face thereof was obtained.

With regard to the honeycomb structural body manufactured as described above, the M1 value was measured in the same manner as in the case of the above-mentioned ceramic block, using the three dimensional measurement device. As a result, the M1 value was 0.0 mm due to no formation of irregularities.

The sealing material (coating) layer was then processed so as to form irregularities on the honeycomb structural body, and the M1 value was set to 0.3 mm.

Examples 2 to 11, Reference Examples 1 to 4, and Comparative Examples 1 to 12

In the same manner as in Example 1, the resultant ceramic block and honeycomb structural body were processed to adjust irregularities on the surfaces thereof to form a honeycomb structural body (ceramic block) having M1 and M2 values as shown in Table 1.

It is to be noted that, in Examples 10 to 11, a ceramic block was formed in the same manner as in Example 1 except for using, as the sealing material (adhesive) paste, a heat resistant sealing material (adhesive) paste containing 30% by weight of alumina fibers having a fiber length of 20 μm, 21% by weight of silicon carbide particles having an average particle size of 0.6 μm, 15% by weight of silica sol, 5.6% by weight of carboxymethyl cellulose and 28.4% by weight of water, and the resultant ceramic block was processed to manufacture and process a honeycomb structural body. Further, in Comparative Example 1, a honeycomb structural body was manufactured in the same manner as in Example 1, except that the resultant ceramic block and honeycomb structural body were not processed.

Evaluation Test 1: Thermal Shock Test

Each of the honeycomb structural bodies according to Examples 1 to 11, Reference Examples 1 to 4, and Comparative Examples 1 to 12 was placed into an electric furnace, and the temperature thereof was raised to a target temperature at 20° C./min, kept at 600° C. or 800° C. for 1 hour, and then cooled to ordinary temperature. The presence/absence of cracks in the honeycomb structural bodies was visually observed. The results of the observation are shown in Table 1.

Evaluation Test 2: Push-Out Strength Measurement

Each of the honeycomb structural body according to Examples 1 to 11, Reference Examples 1 to 4, and Comparative Examples 1 to 12 was wrapped with a non-expansive alumina fiber mat (MAFTECH, manufactured by Mitsubishi Chemical Corp.) having a thickness of 7 mm, and inserted into a cylindrical metal case, and push-out load was then imposed by the Instron machine, to measure strength with which the honeycomb structural body was pushed out. The results of the measurement are shown in Table 1.

TABLE 1

| | M1 (mm) | M2 (mm) | Thermal shock test (600° C.) | Thermal shock test (800° C.) | Push-out strength (Kg) |
|---|---|---|---|---|---|
| Example 1 | 0.3 | 0.5 | Without crack | Without crack | 15 |
| Example 2 | 0.3 | 3.5 | Without crack | Without crack | 15 |
| Example 3 | 0.3 | 7 | Without crack | Without crack | 17 |
| Example 4 | 1.5 | 0.5 | Without crack | Without crack | 17 |
| Example 5 | 1.5 | 3.5 | Without crack | Without crack | 17 |
| Example 6 | 1.5 | 7 | Without crack | Without crack | 17 |
| Example 7 | 3.0 | 0.5 | Without crack | Without crack | 15 |
| Example 8 | 3.0 | 3.5 | Without crack | Without crack | 15 |
| Example 9 | 3.0 | 7 | Without crack | Without crack | 15 |
| Example 10 | 0.3 | 0.5 | Without crack | Without crack | 15 |
| Example 11 | 1.5 | 7 | Without crack | Without crack | 17 |
| Reference Example 1 | 3.5 | 0.5 | Without crack | With crack | 10 |
| Reference Example 2 | 3.5 | 3.5 | Without crack | With crack | 10 |
| Reference Example 3 | 3.5 | 7.0 | Without crack | With crack | 10 |
| Reference Example 4 | 3.5 | 8.0 | Without crack | With crack | 10 |
| Comparative Example 1 | 0.0 | 0.0 | With crack | With crack | 7 |
| Comparative Example 2 | 0.0 | 0.5 | With crack | With crack | 7 |
| Comparative Example 3 | 0.0 | 3.5 | With crack | With crack | 7 |
| Comparative Example 4 | 0.0 | 7.0 | With crack | With crack | 7 |
| Comparative Example 5 | 0.0 | 8.0 | With crack | With crack | 7 |
| Comparative Example 6 | 0.3 | 0.0 | With crack | With crack | 15 |
| Comparative Example 7 | 0.3 | 8.0 | With crack | With crack | 15 |
| Comparative Example 8 | 1.5 | 0.0 | With crack | With crack | 17 |
| Comparative Example 9 | 1.5 | 8.0 | With crack | With crack | 17 |
| Comparative Example 10 | 3.0 | 0.0 | With crack | With crack | 15 |
| Comparative Example 11 | 3.0 | 8.0 | With crack | With crack | 15 |
| Comparative Example 12 | 3.5 | 0.0 | With crack | With crack | 10 |

As apparent from the results shown in Table 1, the honeycomb structural bodies according to Examples 1 to 11 had large push-out strength exceeding 10 kg, and even with thermal shock applied, no cracks or the like are generated in the vicinity of the outer peripheral faces of the honeycomb structural bodies according to Examples 1 to 11.

On the other hand, some of the honeycomb structural bodies according to Comparative Examples 1 to 12 had low push-out strength. Even those which had large push-out strength, they were vulnerable to thermal shock.

Example 12

Next, a honeycomb structural body was manufactured in which a center-of-gravity $c_2$ of a ceramic block and a center-of-gravity $c_1$ of a honeycomb structural body were displaced from each other.

Specifically, in the same manner as in Example 1, a honeycomb structural body, with the M2 value set to 0.5 mm, was manufactured, and thereafter a honeycomb structural body, with the M2 value set to 0.5 mm, was manufactured by change in balance of thickness of the sealing material (coating) layer.

Examples 13 to 19 and Reference Examples 5 to 6

In the same manner as in Example 12, ceramic blocks and honeycomb structural bodies having the M1, M2 and $c_1$-$c_2$ values shown in Table 2 were manufactured with changes in thickness of the sealing material (coating) layer. It should be noted that, in Examples 18 to 19, the same sealing material (adhesive) paste as in Examples 10 to 11 was used to manufacture ceramic blocks and honeycomb structural bodies having the M1, M2 and $c_1$-$c_2$ values shown in Table 2.

In the same manner as in Examples 1 to 11 and the like, the honeycomb structural bodies according to Examples 12 to 19 and Reference Examples 5 to 6 were wrapped with an alumina mat, and then inserted into a cylindrical metal case, on which push-out load was imposed.

Figure 11:
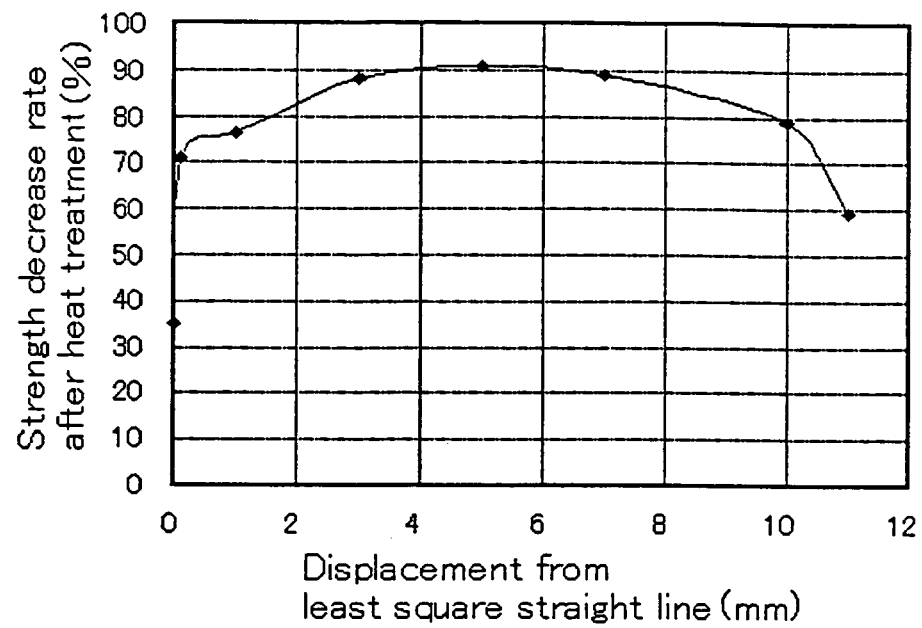
FIG. 11 is a graph showing results of Examples 12 to 19.

Further, the resultant honeycomb structural bodies were heat-treated in an electric furnace at 600° C. for 30 hours, and then push-out strength was measured. It should be noted that the strength decrease rate after heat treatment, shown in Table 2, indicates a rate of push-out strength after heat treatment to push-out strength before heat treatment, on a percentage basis. FIG. 11 is a graph showing the results of Examples 12 to 19.

TABLE 2

| | M1 (mm) | M2 (mm) | Displacement (mm) | Initial push-out strength (kg) | Push-out strength after heat treatment at 600° C. for 30 hours (kg) | Strength decrease rate (%) |
|---|---|---|---|---|---|---|
| Example 12 | 0.5 | 0.5 | 0.1 | 17 | 12 | 71% |

TABLE 2-continued

| | M1 (mm) | M2 (mm) | Displacement (mm) | Initial push-out strength (kg) | Push-out strength after heat treatment at 600° C. for 30 hours (kg) | Strength decrease rate (%) |
|---|---|---|---|---|---|---|
| Example 13 | 0.5 | 0.5 | 1.0 | 17 | 13 | 76% |
| Example 14 | 0.5 | 0.5 | 3.0 | 17 | 15 | 88% |
| Example 15 | 0.5 | 0.5 | 5.0 | 17 | 15.5 | 91% |
| Example 16 | 0.5 | 0.5 | 7.0 | 17 | 15.1 | 89% |
| Example 17 | 0.5 | 0.5 | 10.0 | 17 | 13.5 | 79% |
| Example 18 | 0.5 | 0.5 | 3.0 | 17 | 15 | 88% |
| Example 19 | 0.5 | 0.5 | 7.0 | 17 | 15.1 | 89% |
| Reference Example 5 | 0.5 | 0.5 | 0.0 | 17 | 6 | 35% |
| Reference Example 6 | 0.5 | 0.5 | 11.0 | 17 | 10 | 59% |

As shown in Table 2 and FIG. 11, in each of Examples 12 to 19, the strength decrease rate was 70% or more, or the push-out strength was 70% or more, even after heat treatment, whereas in each of Reference Examples 5 and 6, the strength decrease rate was lower than 60%.

It is to be noted that, upon manufacturing the honeycomb structural bodies according to Examples 1 to 19, Reference Examples 1 to 6 and Comparative Examples 1 to 12, chipping, cracking or the like did not occur in the outer peripheral face of the ceramic block.

Example 20

70 parts by weight of α-type silicon carbide powder having an average particle size of 30 μm, 30 parts by weight of α-type silicon carbide powder having an average particle size of 0.28 μm, 5 parts by weight of methyl cellulose, 4 parts by weight of a dispersing agent, and 20 parts by weight of water were blended, and then mixed in a ball mill for 5 hours to prepare a uniform mixed composition.

An extrusion-molding machine was filled with this resultant mixed composition, and at a push-out rate of 2 cm/min, a plurality of kinds of ceramic molded bodies made of silicon carbide in honeycomb form were formed. One of these ceramic molded bodies was almost the same rectangular pillar as the porous ceramic member 20 shown in FIG. 4A, and had a size of 35 mm×35 mm×300 mm, the number of through holes of 31/cm² and a thickness of the partition wall of 0.35 mm.

Further, using the above mixed composition, a ceramic molded body was formed which had the substantially same shape as that of the porous ceramic member 200 or 210 as shown in FIGS. 4B and 4C, in which a rectangular pillar was partially cut off and part of through holes was exposed at the cut-off portion.

The ceramic molded body was dried by a dryer, such as a microwave drier or a hot-air drier, to form a ceramic dried body made of silicon carbide, and after a predetermined area of the through holes in the ceramic dried body was filled with a plug having the same constituents as those of the above mixed composition, to a depth of 10 mm from the end face, the ceramic dried body was degreased at 450° C., and fired by heating at 2200° C. to manufacture a plurality of kinds of porous ceramic members, having different shapes and made of silicon carbide.

In the above-mentioned process for manufacturing porous ceramic members from ceramic dried bodies, the ceramic molded bodies were held and fixed especially by a fixing jig in which a warped condition remains, to cause the resultant porous ceramic members to be warped.

Next, using a heat resistant sealing material (adhesive) paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, the plurality of kinds of porous ceramic members were bound with one another in large number, and the sealing material (adhesive) paste was then dried to form a cylindrical ceramic block.

Thereafter, a sealing material (coating) layer, having a shape along the irregularities formed on the outer peripheral face of the ceramic block and the same composition as that of the sealing material (adhesive) paste, was formed on the outer peripheral face of the ceramic block so that a number of porous ceramic members made of silicon carbide were bound to one another thorough the sealing material (adhesive) layer, to manufacture a honeycomb structural body which was constituted by including the ceramic block having the irregularities formed on the outer peripheral face thereof.

Examples 21 to 27 and Reference Examples 7 to 8

Each of honeycomb structural bodies was manufactured, in which the porous ceramic member was warped in the same manner as in the case of Example 20, to cause displacement from the least square straight line by the values shown in Table 3. It is to be noted that, in Examples 26 to 27, a honeycomb structural body, having a value of displacement from the least square straight line as shown in Table 3, was manufactured in the same manner as in Example 20 except for using, as the sealing material (adhesive) paste, a heat resistant sealing material (adhesive) paste containing 30% by weight of alumina fibers having a fiber length of 20 μm, 21% by weight of silicon carbide particles having an average particle size of 0.6 μm, 15% by weight of silica sol, 5.6% by weight of carboxymethyl cellulose and 28.4% by weight of water.

With regard to the honeycomb structural bodies thus manufactured in Examples 20 to 27 and Reference Examples 7 to 8, using a three dimensional measurement device (BH-V507, manufactured by Mitsutoyo Corp.), a rate of a distance between a center-of-gravity of a cross-sectional curve perpendicular to the length direction of the ceramic block and a least square curve, to a distance between the center-of-gravity and the outermost point of the cross-sectional curve, was calculated, at five equally spaced positions in the length direction of the ceramic block, by the method described as to the honeycomb structural body of the present invention in the above embodiment. As a result, the measured rate was 0.1%.

Each of the honeycomb structural bodies according to Examples 20 to 27 and Reference examples 7 to 8 was wrapped with an alumina mat and inserted into a metal case, on which push-out load was implied.

Figure 12:
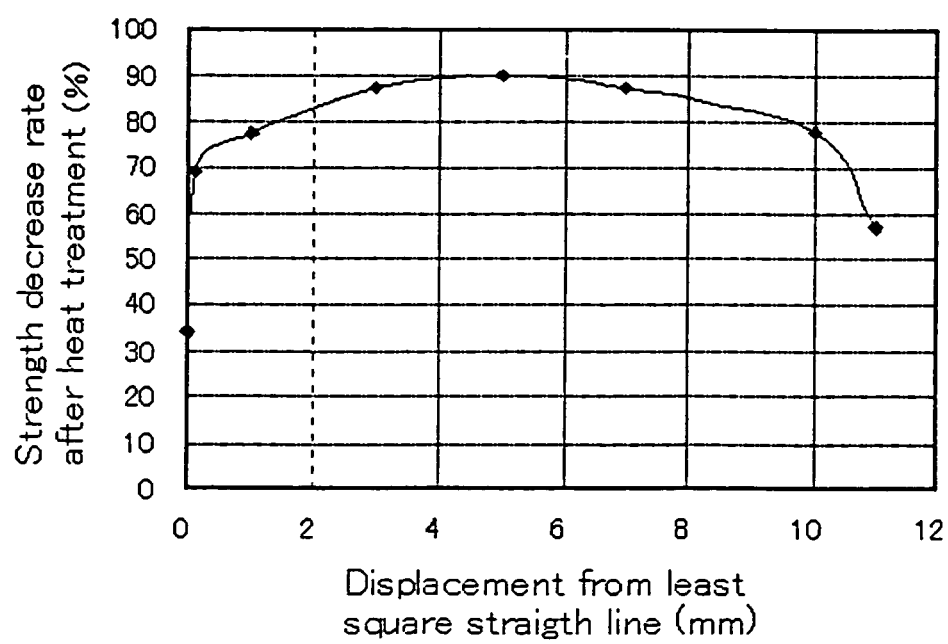
FIG. 12 is a graph showing results of Examples 20 to 27.

The honeycomb structural bodies were then heat-treated in an electric furnace at 600° C. for 30 hours, and then push-out strength was measured. FIG. 12 is a graph showing the results of Examples 20 to 27.

TABLE 3

| | M1 (mm) | M2 (mm) | Displacement from least square straight line (mm) | Initial push-out strength (kg) | Push-out strength after heat treatment at 600° C. for 30 hours (kg) | Strength decrease rate (%) |
|---|---|---|---|---|---|---|
| Example 20 | 0.5 | 0.5 | 0.1 | 17 | 11.8 | 69% |
| Example 21 | 0.5 | 0.5 | 1.0 | 17 | 13.2 | 78% |
| Example 22 | 0.5 | 0.5 | 3.0 | 17 | 14.9 | 88% |
| Example 23 | 0.5 | 0.5 | 5.0 | 17 | 15.3 | 90% |
| Example 24 | 0.5 | 0.5 | 7.0 | 17 | 14.9 | 88% |
| Example 25 | 0.5 | 0.5 | 10.0 | 17 | 13.3 | 78% |
| Example 26 | 0.5 | 0.5 | 1.0 | 17 | 13.2 | 78% |
| Example 27 | 0.5 | 0.5 | 7.0 | 17 | 14.9 | 88% |
| Reference Example 7 | 0.5 | 0.5 | 0.0 | 17 | 5.8 | 34% |
| Reference Example 8 | 0.5 | 0.5 | 11.0 | 17 | 9.8 | 58% |

As shown in Table 3 and FIG. 12, in each of Examples 20 to 27, the strength decrease rate was 69% or more, whereas in each of Reference Examples 7 to 8, the strength decrease rate was lower than 60%.

What is claimed as new and desired to be secured by Letters Patent of the United States is:

1. A honeycomb structural body comprising:
a pillar-shaped ceramic block made of porous ceramic which includes a number of through holes that are placed in parallel with one another in the length direction with a wall portion interposed therebetween; and
a sealing material provided on an outer peripheral portion of said pillar-shaped ceramic block, each of said honeycomb structural body and said pillar-shaped ceramic block having irregularities formed on an outer peripheral face thereof
wherein:
when a least square curve is determined by a least square method on the basis of points constituting the contour of a cross-section perpendicular to the length direction of said honeycomb structural body, a center-of-gravity thereof is defined as c1, a distance between a minimum concentric circumscribed curve, having c1 as the center-of-gravity, of said least square curve and the center-of-gravity c1 is defined as D1, a distance between a maximum concentric inscribed curve, having c1 as the center-of-gravity, of said least square curve and the center-of-gravity c1 is defined as D2, and
(D1-D2) is defined as M1,
the following inequality is satisfied:
about 0.3 mm≦M1; and
when a least square curve is determined by a least square method on the basis of points constituting the contour of a cross-section perpendicular to the length direction of said ceramic block, a center-of-gravity thereof is defined as c2, a distance between a minimum concentric circumscribed curve, having c2 as the center-of-gravity, of said least square curve and the center-of-gravity c2 is defined as D3, a distance between a maximum concentric inscribed curve, having c2 as the center-of-gravity, of said least square curve and the center-of-gravity c2 is defined as D4, and (D3-D4) is defined as M2, the following inequality is satisfied: about 0.5 mm≦M2≦7.0 mm.

2. The honeycomb structural body according to claim 1, wherein said M1 is about 3.0 mm or less.

3. The honeycomb structural body according to claim 1, wherein said ceramic block has a porosity of at least about 20% and at most about 80%.

4. The honeycomb structural body according to claim 3, wherein said ceramic block has a porosity in a range of about 50% to 80%.

5. The honeycomb structural body according to claim 1, wherein said ceramic block is configured by combining a plurality of porous ceramic members to one another.

6. The honeycomb structural body according to claim 5, wherein the plurality of porous ceramic members are combined to one another through a sealing material layer.

7. The honeycomb structural body according to claim 5, wherein the plurality of porous ceramic members include porous ceramic members having different shapes in end face.

8. The honeycomb structural body according to claim 5, wherein each of said porous ceramic members is made of silicon carbide-natured ceramic.

9. The honeycomb structural body according to claim 1, wherein a catalyst is supported.

10. The honeycomb structural body according to claim 1, wherein each of said through holes is sealed at one of ends thereof.

11. The honeycomb structural body according to claim 1, wherein the center-of-gravity c1 does not correspond with the center-of-gravity c2.

12. The honeycomb structural body according to claim 11, wherein a distance between the center-of-gravity c1 and the center-of-gravity c2 is at least about 0.1 mm and at most about 10.0 mm.

13. The honeycomb structural body according to claim 11, wherein said M1 is about 3.0 mm or less.

14. The honeycomb structural body according to claim 11, wherein said ceramic block has a porosity of at least about 20% and at most about 80%.

15. The honeycomb structural body according to claim 14, wherein said ceramic block has a porosity in a range of about 50% to 80%.

16. The honeycomb structural body according to claim 11, wherein said ceramic block is configured by combining a plurality of porous ceramic members to one another.

17. The honeycomb structural body according to claim 16, wherein the plurality of porous ceramic members are combined to one another through a sealing material layer.

18. The honeycomb structural body according to claim 16, wherein the plurality of porous ceramic members include porous ceramic members having different shapes in end face.

19. The honeycomb structural body according to claim 16, wherein each of said porous ceramic members is made of silicon carbide-natured ceramic.

20. The honeycomb structural body according to claim 11, wherein a catalyst is supported.

21. The honeycomb structural body according to claim 11, wherein each of said through holes is sealed at one of ends thereof.

22. The honeycomb structural body according to claim 1, wherein when at least three points are determined as the centers-of-gravities c2 of the least square curves in the length direction of said ceramic block, these centers-ofgravities c2 are not present on a straight line in parallel with the length direction of said ceramic block.

23. The honeycomb structural body according to claim 22, wherein said M1 is about 3.0 mm or less.

24. The honeycomb structural body according to claim 22, wherein said ceramic block has a porosity of at least about 20% and at most about 80%.

25. The honeycomb structural body according to claim 24, wherein said ceramic block has a porosity in a range of about 50% to 80%.

26. The honeycomb structural body according to claim 22, wherein said ceramic block is configured by combining a plurality of porous ceramic members to one another.

27. The honeycomb structural body according to claim 26, wherein the plurality of porous ceramic members are combined to one another through a sealing material layer.

28. The honeycomb structural body according to claim 26, wherein the plurality of porous ceramic members include porous ceramic members having different shapes in end face.

29. The honeycomb structural body according to claim 26, wherein each of said porous ceramic members is made of silicon carbide-natured ceramic.

30. The honeycomb structural body according to claim 22, wherein a catalyst is supported.

31. The honeycomb structural body according to claim 22, wherein each of said through holes is sealed at one of ends thereof.

32. The honeycomb structural body according to claim 1, wherein when at least three points are determined as the centers-of-gravities c1 of the least square curves in the length direction of said honeycomb structural body, these centers-of-gravities c1 are not present on a straight line in parallel with the length direction of said honeycomb structural body.

33. The honeycomb structural body according to claim 32, wherein said M1 is about 3.0 mm or less.

34. The honeycomb structural body according to claim 32, wherein said ceramic block has a porosity of at least about 20% and at most about 80%.

35. The honeycomb structural body according to claim 34, wherein said ceramic block has a porosity in a range of about 50% to 80%.

36. The honeycomb structural body according to claim 32, wherein said ceramic block is configured by combining a plurality of porous ceramic members to one another.

37. The honeycomb structural body according to claim 36, wherein the plurality of porous ceramic members are combined to one another through a sealing material layer.

38. The honeycomb structural body according to claim 36, wherein the plurality of porous ceramic members include porous ceramic members having different shapes in end face.

39. The honeycomb structural body according to claim 36, wherein each of said porous ceramic members is made of silicon carbide-natured ceramic.

40. The honeycomb structural body according to claim 32, wherein a catalyst is supported.

41. The honeycomb structural body according to claim 32, wherein each of said through holes is sealed at one of ends thereof.

42. An exhaust gas purifying device comprising the honeycomb structural body according to any one of claims 1 to 41, wherein said honeycomb structural body is installed in a casing connected to an exhaust passage in an internal combustion engine through a mat-like holding sealing material.

43. The exhaust gas purifying device according to claim 42, wherein said mat-like holding sealing material is a non-expansive ceramic fiber mat.

44. A manufacturing method of a honeycomb structural body comprising a pillar-shaped ceramic block made of porous ceramic which includes a number of through holes that are placed in parallel with one another in the length direction with a wall portion interposed therebetween; and a sealing material provided on an outer peripheral portion of said pillar-shaped ceramic block, each of said honeycomb structural body and said pillar-shaped ceramic block having irregularities formed on an outer peripheral face thereof wherein: when a least square curve is determined by a least square method on the basis of points constituting the contour of a cross-section perpendicular to the length direction of said honeycomb structural body, a center-of-gravity thereof is defined as $c_1$, a distance between a minimum concentric circumscribed curve, having $c_1$ as the center-of-gravity, of said least square curve and the center-of-gravity $c_1$ is defined as D1, a distance between a maximum concentric inscribed curve, having $c_1$ as the center-of-gravity, of said least square curve and the center-of-gravity $c_1$ is defined as D2, and (D1-D2) is defined as M1, the following inequality is satisfied: about 0.3 mm $\leq$M1; and when a least square curve is determined by a least square method on the basis of points constituting the contour of a cross-section perpendicular to the length direction of said ceramic block, a center-of-gravity thereof is defined as $c_2$, a distance between a minimum concentric circumscribed curve, having $c_2$ as the center-of-gravity, of said least square curve and the center-of-gravity $c_2$ is defined as D3, a distance between a maximum concentric inscribed curve, having $c_2$ as the center-of-gravity, of said least square curve and the center-of-gravity $c_2$ is defined as D4, and (D3-D4) is defined as M2, the following inequality is satisfied: about 0.5 mm $\leq$M2 $\leq$7.0 mm, wherein the method comprises a step of:
    processing an outer peripheral face of a ceramic dried body obtained by drying a ceramic molded body that contains a ceramic material constituting each of said porous ceramic members so as to form a plurality of kinds of ceramic dried bodies having different shapes.

45. The manufacturing method of the honeycomb structural body according to claim 44, wherein each of said porous ceramic members is made of silicon carbide-natured ceramic.

46. The manufacturing method of the honeycomb structural body according to claim 44, wherein each of said through holes is sealed at one of ends thereof.

47. The manufacturing method of the honeycomb structural body according to claim 44, wherein said ceramic block has a porosity of at least about 20% and at most about 80%.

48. The manufacturing method of the honeycomb structural body according to claim 47, wherein said ceramic block has a porosity in a range of about 50% to 80%.

49. A manufacturing method of a honeycomb structural body comprising a pillar-shaped ceramic block made of porous ceramic which includes a number of through holes that are placed in parallel with one another in the length direction with a wall portion interposed therebetween; and a sealing material provided on an outer peripheral portion of said pillar-shaped ceramic block, each of said honeycomb structural body and said pillar-shaped ceramic block having irregularities formed on an outer peripheral face thereof wherein: when a least square curve is determined by a least square method on the basis of points constituting the contour of a cross-section perpendicular to the length direction of said honeycomb structural body, a center-of-gravity thereof is defined as $c_1$, a distance between a minimum concentric circumscribed curve, having $c_1$ as the center-of-gravity, of said least square curve and the center-of-gravity $c_1$ is defined as D1, a distance between a maximum concentric inscribed curve, having $c_1$ as the center-of-gravity, of said least square curve and the center-of-gravity $c_1$ is defined as D2, and (D1-D2) is defined as M1, the following inequality is satisfied: about 0.3 mm≦M1; and when a least square curve is determined by a least square method on the basis of points constituting the contour of a cross-section perpendicular to the length direction of said ceramic block, a center-of-gravity thereof is defined as $c_2$, a distance between a minimum concentric circumscribed curve, having $c_2$ as the center-of-gravity, of said least square curve and the center-of-gravity $c_2$ is defined as D3, a distance between a maximum concentric inscribed curve, having $c_2$ as the center-of-gravity, of said least square curve and the center-of-gravity $c_2$ is defined as D4, and (D3-D4) is defined as M2, the following inequality is satisfied: about 0.5 mm≦M2≦7.0 mm, wherein the method comprises a step of:

performing extrusion molding to form ceramic molded bodies having a plurality of kinds of cross-sectional shapes.

50. The manufacturing method of the honeycomb structural body according to claim 49, wherein each of said porous ceramic members is made of silicon carbide-natured ceramic.

51. The manufacturing method of the honeycomb structural body according to claim 49, wherein each of said through holes is sealed at one of ends thereof.

52. The manufacturing method of the honeycomb structural body according to claim 49, wherein said ceramic block has a porosity of at least about 20% and at most about 80%.

53. The manufacturing method of the honeycomb structural body according to claim 52, wherein said ceramic block has a porosity in a range of about 50% to 80%.

* * * * *